(12) United States Patent
Kang et al.

(10) Patent No.: US 7,985,153 B2
(45) Date of Patent: Jul. 26, 2011

(54) HYDRAULIC CONTROL SYSTEM OF 8-SPEED AUTOMATIC TRANSMISSION FOR VEHICLES

(75) Inventors: Hyun Goo Kang, Hwaseong (KR); Jin Soo Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 902 days.

(21) Appl. No.: 11/950,278

(22) Filed: Dec. 4, 2007

(65) Prior Publication Data

US 2008/0318723 A1 Dec. 25, 2008

(30) Foreign Application Priority Data

Jun. 20, 2007 (KR) .................. 10-2007-0060636

(51) Int. Cl.
*F16H 61/30* (2006.01)
(52) U.S. Cl. ........................... 475/116; 475/123
(58) Field of Classification Search .................. 475/116, 475/122, 123, 128
See application file for complete search history.

(56) References Cited

U.S. PATENT DOCUMENTS

| | | | | |
|---|---|---|---|---|
| 6,394,926 B1 * | 5/2002 | Jang | ............................ | 475/116 |
| 6,478,707 B1 * | 11/2002 | Jang | ............................ | 475/119 |
| 6,656,075 B2 * | 12/2003 | Park et al. | ..................... | 475/128 |
| 7,314,423 B2 * | 1/2008 | Park | ............................ | 475/116 |
| 7,344,466 B2 * | 3/2008 | Park | ............................ | 475/116 |

* cited by examiner

*Primary Examiner* — Sherry Estremsky
(74) *Attorney, Agent, or Firm* — Morgan, Lewis & Bockius LLP

(57) ABSTRACT

A hydraulic control system of an eight-speed automatic transmission includes a first clutch/second clutch control portion controlled by a first proportional control solenoid valve and selectively supplying hydraulic pressure of a first pressure control valve to the first clutch or the second clutch; a third clutch control portion controlled by a second proportional control solenoid valve and supplying hydraulic pressure of a second pressure control valve to the third clutch; a fourth clutch/first brake control portion controlled by a third proportional control solenoid valve and selectively supplying hydraulic pressure of a third pressure control valve to the fourth clutch or the first brake, the fourth clutch/first brake control portion supplying reverse range pressure to the first brake at the reverse speed; and a second brake control portion controlled by a fourth proportional control solenoid valve and directly supplying hydraulic pressure of a fourth pressure control valve to the second brake.

24 Claims, 11 Drawing Sheets

FIG.2

|     | C1 | C2 | C3 | C4 | B1 | B2 | F |
|-----|----|----|----|----|----|----|---|
| D1  | ○  |    |    |    | V  |    | ○ |
| D2  | ○  |    |    |    |    | ○  |   |
| D3  | ○  |    |    | ○  |    |    |   |
| D4  | ○  |    | ○  |    |    |    |   |
| D5  |    |    | ○  | ○  |    |    |   |
| D6  |    | ○  | ○  |    |    |    |   |
| D7  |    |    | ○  |    |    | ○  |   |
| D8  |    |    | ○  |    | ○  |    |   |
| REV |    |    |    | ○  | ○  |    |   |

V is operated at L range

HYDRAULIC CONTROL SYSTEM OF 8-SPEED AUTOMATIC TRANSMISSION FOR VEHICLES

CROSS-REFERENCE TO RELATED APPLICATION

This application claims priority to and the benefit of Korean Patent Application No. 10-2007-0060636, filed in the Korean Intellectual Property Office on Jun. 20, 2007, the entire contents of which are incorporated herein by reference.

BACKGROUND OF THE INVENTION (a) Field of the Invention

The present invention relates to a hydraulic control system of an eight-speed automatic transmission for vehicles. More particularly, the present invention relates to a hydraulic control system of an eight-speed automatic transmission for vehicles that minimizes shift shock and improves shift performance and fuel consumption by realizing precise control.

(b) Description of the Related Art

Typical automatic transmissions include a torque converter and a power train of a multiple speed gear mechanism connected to the torque converter. In addition, a hydraulic control system is provided at an automatic transmission for selectively operating at least one operational element included in the power train according to a running state of a vehicle.

Such an automatic transmission includes a power train and a hydraulic control system. The power train includes a compound planetary gear set, formed by combining at least two simple planetary gear sets to achieve the required multiple speeds, and a plurality of friction members. The hydraulic control system selectively operates the friction members of the power train according to driving conditions.

A variety of such power trains and hydraulic control systems have been developed by vehicle manufacturers according to their own schemes. Currently, four-speed automatic transmissions are most often found on the market. However, six-speed and seven-speed automatic transmissions have also been realized for enhancement of performance of power transmission and for enhanced fuel mileage of a vehicle.

Recently, developing further from such seven-speed automatic transmissions, eight-speed automatic transmissions are under investigation such that performance of power transmission of an automatic transmission, and thereby fuel mileage of a vehicle, are being further enhanced.

The above information disclosed in this Background section is only for enhancement of understanding of the Background of the invention and therefore it may contain information that does not form the prior art that is already known in this country to a person of ordinary skill in the art.

SUMMARY OF THE INVENTION

The present invention has been made in an effort to provide a hydraulic control system of an eight-speed automatic transmission for vehicles, in which six friction members are controlled by four proportional control solenoid valves, having advantages of obtaining enhanced overall performance by achieving a minimization of shift shock and enhancement of fuel consumption as a consequence of achieving precise and effective control.

A hydraulic control system of an eight-speed automatic transmission for vehicles is provided according to an exemplary embodiment of the present invention, wherein a first clutch is operated at first, second, third, and fourth forward speeds, a second clutch is operated at a sixth forward speed, a third clutch is operated at fourth, fifth, sixth, seventh, and eighth forward speeds, a fourth clutch is operated at the third and fifth forward speeds and a reverse speed, a first brake is operated at the eighth forward speed and the reverse speed, and a second brake is operated at the second and seventh forward speeds The hydraulic control system of an eight-speed automatic transmission for vehicles may include: a first clutch/second clutch control portion controlled by a first proportional control solenoid valve and selectively supplying hydraulic pressure of a first pressure control valve to the first clutch or the second clutch; a third clutch control portion controlled by a second proportional control solenoid valve and supplying hydraulic pressure of a second pressure control valve to the third clutch as operating hydraulic pressure of the third clutch; a fourth clutch/first brake control portion controlled by a third proportional control solenoid valve and selectively supplying hydraulic pressure of a third pressure control valve to the fourth clutch or the first brake, the fourth clutch/first brake control portion supplying reverse range pressure to the first brake at the reverse speed; and a second brake control portion controlled by a fourth proportional control solenoid valve and directly supplying hydraulic pressure of a fourth pressure control valve to the second brake.

The first, second, and fourth pressure control valves may be controlled by forward range pressure, and the third pressure control valve may be controlled by line pressure.

The hydraulic control system of this invention may further include first, second, third, and fourth pressure switching valves that supply a part of output pressure of the first, second, third, and fourth pressure control valves back to the first, second, third, and fourth pressure control valves as their control pressures, respectively.

The first clutch/second clutch control portion may further include a first switching valve that selectively supplies hydraulic pressure received from the first pressure control valve to the first clutch or the second clutch by control pressure of a first on/off solenoid valve.

The first switching valve may include: a valve body including a first port fluidly communicating with an output port of the first pressure control valve, a second port supplying hydraulic pressure received through the first port to the first clutch, a third port supplying the hydraulic pressure received through the first port to the second clutch, and a fourth port receiving the control pressure of the first on/off solenoid valve; and a valve spool mounted in the valve body and enabling conversion of a hydraulic path according to the control pressure received through the fourth port.

The fourth clutch/first brake control portion may include third and fourth switching valves, wherein the third switching valve selectively supplies hydraulic pressure received from the third pressure control valve to the fourth clutch or the fourth switching valve by control pressure of a second on/off solenoid valve, and the fourth switching valve selectively supplies the hydraulic pressure received from the third switching valve or the reverse range pressure to the first brake.

The third switching valve may include: a valve body including a first port fluidly communicating with an output port of the third pressure control valve, a second port supplying hydraulic pressure received through the first port to the fourth switching valve, a third port supplying the hydraulic pressure received through the first port to the fourth clutch, and a fourth port receiving the control pressure of the second on/off solenoid valve; and a valve spool mounted in the valve body and enabling conversion of a hydraulic path according to the control pressure received through the fourth port.

The fourth switching valve may include: a valve body including a first port receiving the reverse range pressure as control pressure of the fourth switching valve, a second port selectively receiving a part of operating hydraulic pressure of the fourth clutch or the second brake as control pressure of the fourth switching valve, a third port receiving the hydraulic pressure from the third switching valve, a fourth port supplying the hydraulic pressure received through the third port to the first brake, and a fifth port receiving the reverse range pressure; and a valve spool mounted in the valve body and enabling conversion of a hydraulic path according to the control pressure received through the first and second ports.

The hydraulic control system of this invention may further include a fifth switching valve that supplies line pressure to the third pressure control valve and supplies the reverse range pressure to the third switching valve.

The fifth switching valve may supply line pressure to the third pressure control valve by control pressure of a third on/off solenoid valve at a forward speed, and may be controlled by the reverse range pressure at the reverse speed so as to supply the reverse range pressure to the fourth switching valve.

The fifth switching valve may include: a valve body including a first port receiving the control pressure from the third on/off solenoid valve, a second port receiving the reverse range pressure as control pressure of the fifth switching valve from a manual valve, a third port receiving the reverse range pressure from the manual valve, a fourth port supplying hydraulic pressure of the third port to the fourth switching valve, a fifth port exhausting hydraulic pressure of the fourth port, a sixth port receiving the line pressure from the fourth pressure switching valve, and a seventh port supplying hydraulic pressure of the sixth port to the third pressure control valve; and a valve spool mounted in the valve body and enabling conversion of a hydraulic path according to the control pressure received through the first and second ports.

A hydraulic control system of an eight-speed automatic transmission for vehicles according to another exemplary embodiment of the present invention, wherein a first clutch is operated at first, second, third, and fourth forward speeds, a second clutch is operated at a sixth forward speed, a third clutch is operated at fourth, fifth, sixth, seventh, and eighth forward speeds, a fourth clutch is operated at the third and fifth forward speeds and a reverse speed, a first brake is operated at the eighth forward speed and the reverse speed, and a second brake is operated at the second and seventh forward speeds, may include: a first clutch/second clutch control portion controlled by a first proportional control solenoid valve and selectively supplying hydraulic pressure of a first pressure control valve to the first clutch or the second clutch according to control of a first switching valve; a third clutch control portion controlled by a second proportional control solenoid valve and supplying hydraulic pressure of a second pressure control valve to the third clutch as operating hydraulic pressure thereof; a fourth clutch/first brake control portion controlled by a third proportional control solenoid valve and selectively supplying hydraulic pressure of a third pressure control valve to the fourth clutch or the first brake, wherein the fourth clutch receives the hydraulic pressure of the third pressure control valve through a third switching valve and the first brake selectively receives the hydraulic pressure of the third pressure control valve or a reverse range pressure through a fourth switching valve; and a second brake control portion controlled by a fourth proportional control solenoid valve and directly supplying hydraulic pressure of a fourth pressure control valve to the second brake.

The first clutch/second clutch control portion may include: the first pressure control valve integrally formed with the first proportional control solenoid valve; a first pressure switching valve operated by control pressure of the first proportional control solenoid valve and control pressure of a second reducing valve and supplying a part of output pressure of the first pressure control valve back to the first pressure control valve as control pressure thereof; and the first switching valve enabling conversion of a hydraulic path by a first on/off solenoid valve so as to selectively supply operating hydraulic pressure to the first clutch or the second clutch.

The first switching valve may include: a valve body including a first port fluidly communicating with an output port of the first pressure control valve, a second port supplying hydraulic pressure received through the first port to the first clutch, a third port supplying the hydraulic pressure received through the first port to the second clutch, and a fourth port receiving control pressure of the first on/off solenoid valve; and a valve spool mounted in the valve body and enabling conversion of a hydraulic path according to the control pressure received through the fourth port.

The third clutch control portion may include: the second pressure control valve integrally formed with the second proportional control solenoid valve; a second pressure switching valve operated by control pressure of the second proportional control solenoid valve and control pressure of a second reducing valve and supplying a part of output pressure of the second pressure control valve back to the second pressure control valve as control pressure thereof; a second switching valve relaying hydraulic pressure received from the second pressure control valve; and a fail-safe valve supplying operating hydraulic pressure received from the second switching valve to the third clutch according to control pressure received through three different routes.

The fail-safe valve may be controlled by a line pressure, operating hydraulic pressure of the first clutch, and operating hydraulic pressure of the second brake or the fourth clutch.

The fail-safe valve may include: a valve body including a first port receiving operating hydraulic pressure for the third clutch from the second switching valve, a second port supplying hydraulic pressure received through the first port to the third clutch, a third port exhausting the hydraulic pressure of the second port, a fourth port receiving the line pressure as control pressure of the fail-safe valve, a fifth port receiving the operating hydraulic pressure of the fourth clutch or the second brake as control pressure of the fail-safe valve, and a sixth port receiving the operating hydraulic pressure of the first clutch as control pressure of the fail-safe valve; and a valve spool mounted in the valve body and enabling conversion of a hydraulic path according to the control pressure received through the fourth, fifth, and sixth ports.

The fourth clutch/first brake control portion may include: the third pressure control valve integrally formed with the third proportional control solenoid valve; a third pressure switching valve operated by control pressure of the third proportional control solenoid valve and control pressure of the second reducing valve and supplying a part of output pressure of the third pressure control valve back to the third pressure control valve as control pressure thereof, the third switching valve selectively supplying the hydraulic pressure received from the third pressure control valve to the fourth clutch or the first brake according to control of the second on/off solenoid valve; the fourth switching valve selectively supplying the hydraulic pressure received from the third switching valve or the reverse range pressure to the first brake; and a fifth switching valve supplying line pressure to the third pressure control valve according to control of the third on/off solenoid valve and supplying the reverse range pressure to the fourth switching valve according to control of the reverse range pressure.

The third switching valve may include: a valve body including a first port fluidly communicating with an output port of the third pressure control valve, a second port supplying hydraulic pressure received through the first port to the fourth switching valve, a third port supplying the hydraulic pressure received through the first port to the fourth clutch, and a fourth port receiving control pressure of the second on/off solenoid valve; and a valve spool mounted in the valve body and enabling conversion of a hydraulic path according to the control pressure received through the fourth port.

The fourth switching valve may include: a valve body including a first port receiving the reverse range pressure as control pressure of the fourth switching valve, a second port selectively receiving a part of the operating hydraulic pressure of the fourth clutch or the second brake as control pressure of the fourth switching valve, a third port receiving the hydraulic pressure from the third switching valve, a fourth port supplying the hydraulic pressure received through the third port to the first brake, and a fifth port receiving the reverse range pressure; and a valve spool mounted in the valve body and enabling conversion of a hydraulic path according to the control pressure received through the first and second ports.

The fifth switching valve may supply the line pressure to the third pressure control valve according to control pressure of the third on/off solenoid valve at a forward speed, and may supply the reverse range pressure to the fourth switching valve according to control of the reverse range pressure at the reverse speed.

The fifth switching valve may include: a valve body including a first port receiving control pressure from the third on/off solenoid valve, a second port receiving the reverse range pressure from a manual valve as control pressure of the fifth switching valve, a third port receiving the reverse range pressure from the manual valve, a fourth port supplying the hydraulic pressure of the third port to the fourth switching valve, a fifth port exhausting the hydraulic pressure of the fourth port, a sixth port receiving line pressure from the fourth pressure switching valve, and a seventh port supplying the hydraulic pressure of the sixth port to the third pressure control valve; and a valve spool mounted in the valve body and enabling conversion of a hydraulic path according to the control pressure received through the first and second ports.

The second brake control portion may include: the fourth pressure control valve integrally formed with the fourth proportional control solenoid valve; a fourth pressure switching valve operated by control pressure of the fourth proportional control solenoid valve and control pressure of a second reducing valve and supplying a part of output pressure of the fourth pressure control valve back to the fourth pressure control valve; and a shuttle valve selectively supplying operating hydraulic pressure of the second brake or the fourth clutch to a fail-safe valve or the fourth switching valve as control pressure thereof.

The shuttle valve may include: a valve body including a first port fluidly communicating with the fourth clutch, a second port fluidly communicating with the second brake, a third port selectively fluid-communicating with the first port, and a fourth port selectively fluid-communicating with the second port; and a valve spool mounted in the valve body and enabling conversion of a hydraulic path according to hydraulic pressure received through the first and second ports.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 is an operational chart for frictional members of a power train shown in FIG. 1.

Figure 1:
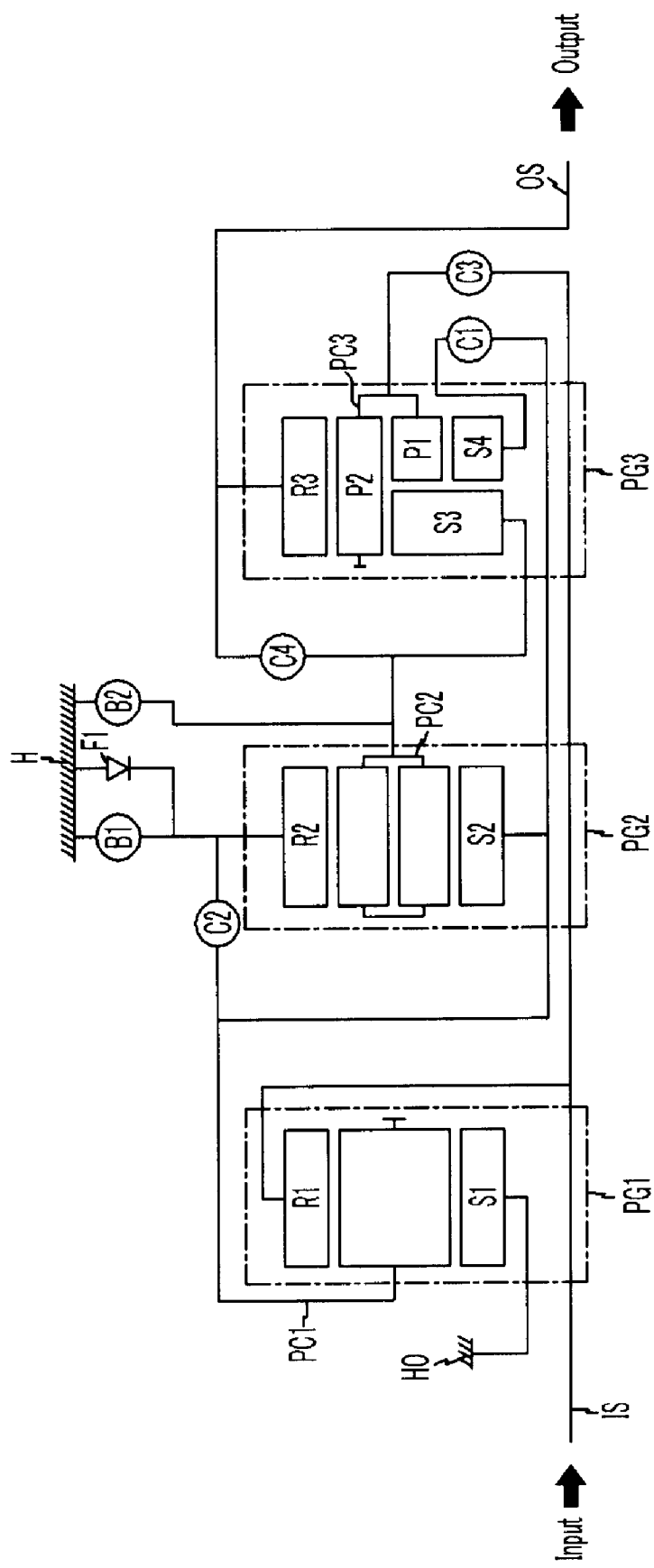
FIG. 1 is a schematic diagram of an exemplary power train that may be operated by a hydraulic control system according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An embodiment of the present invention will hereinafter be described in detail with reference to the accompanying drawings.

FIG. 1 is a schematic diagram of an exemplary power train that may be operated by a hydraulic control system according to an exemplary embodiment of the present invention.

An exemplary power train that may be operated by a hydraulic control system according to an exemplary embodiment of the present invention includes a first planetary gear set PG1 as a single pinion planetary gear set, a second planetary gear set PG2 as a double pinion planetary gear set, a third planetary gear set PG3 as a Ravigneaux planetary gear set, four clutches C1, C2, C3, and C4, and two brakes B1 and B2.

The first planetary gear set PG1 includes a first sun gear S1, a first ring gear R1, and a first planet carrier PC1 as operational elements thereof.

The second planetary gear set PG2 includes a second sun gear S2, a second ring gear R2, and a second planet carrier PC2 as operational elements thereof.

The third planetary gear set PG3 includes a third sun gear S3, a fourth sun gear S4, a third ring gear R3, and a third planet carrier PC3 as operational elements thereof. The fourth sun gear S4 is engaged with a short pinion P1, and the third sun gear S3 is engaged with a long pinion P2.

The first sun gear S1 is fixedly connected to a transmission housing HO and always operates as a fixed element. The first ring gear R1 is fixedly connected to an input shaft IS and always operates as an input element.

The first planet carrier PC1 is fixedly connected to the second sun gear S2, is selectively connected to the fourth sun gear S4 by operation of a first clutch C1, and is selectively connected to the second ring gear R2 by operation of a second clutch C2.

The second ring gear R2 is selectively connected to the transmission housing HO by operation of a first brake B1, and is connected to the transmission housing HO by interposing a one-way clutch F1 that is disposed in parallel with the first brake B1.

The third planet carrier PC3 is selectively connected to the input shaft IS by operation of a third clutch C3 and selectively operates as an input element.

The third sun gear S3 is directly connected to the second planet carrier PC2, is selectively connected to the transmission housing HO by operation of a second brake B2, and is selectively connected to the third ring gear R3 by operation of a fourth clutch C4.

The third ring gear R3 is fixedly connected to an output shaft OS and always operated as an output element.

As shown in FIG. 2, the first clutch C1 and the one-way clutch F1 are operated at a first forward speed D1 the first clutch C1 and the second brake B2 are operated at a second forward speed D2, the first and fourth clutches C1 and C4 are operated at a third forward speed D3, the first and third clutches C1 and C3 are operated at a fourth forward speed D4, the third and fourth clutches C3 and C4 are operated at a fifth forward speed D5, the second and third clutches C2 and C3 are operated at a sixth forward speed D6, the third clutch C3 and the second brake B2 are operated at a seventh forward speed D7, the third clutch C3 and the first brake B1 are operated at an eighth forward speed D8, and the fourth clutch C4 and the first brake B1 are operated at a reverse speed REV according to such a power train.

As shown in FIG. 2, shifting processes according to such a power train are obvious to a person of ordinary skill in the art and thus will not be described in further detail.

Figure 3:
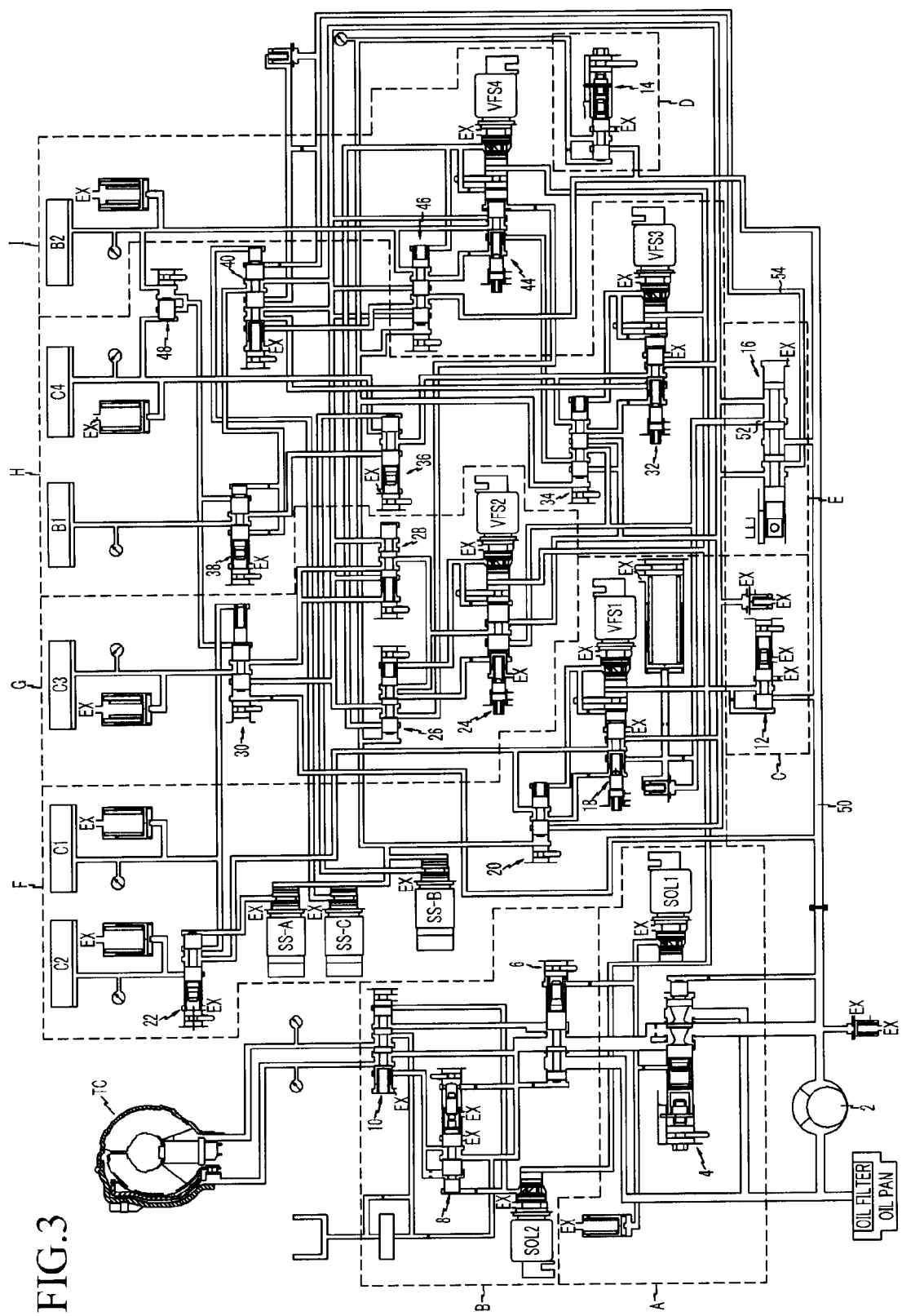
FIG. 3 is a schematic diagram of a hydraulic control system according to an exemplary embodiment of the present invention.

FIG. 3 is a schematic diagram of a hydraulic control system according to an exemplary embodiment of the present invention.

A hydraulic control system according to an exemplary embodiment of the present invention includes a line pressure control portion A, a launch control portion B, first and second pressure reduction control portions C and D, a manual shifting control portion E, a first clutch/second clutch control portion F, a third clutch control portion G, a fourth clutch/first brake control portion H, and a second brake control portion I, and supplies hydraulic pressure to or releases hydraulic pressure from each of the frictional members C1, C2, C3, C4, B1, and B2 of the power train.

The line pressure control portion A and the launch control portion B may be formed according to a conventional scheme. For example, the line pressure control portion A includes a line regulator valve 4 and a proportional control solenoid valve SOL1 that controls the line regulator valve 4. The line pressure control portion A controls hydraulic pressure supplied from a hydraulic pump 2 to be stable, and changes line pressure according to driving conditions so as to enhance fuel consumption.

The launch control portion B includes a torque converter control valve 6 for controlling a damper clutch, a damper clutch pressure control valve 8 for controlling engagement and release of the damper clutch, a proportional control solenoid valve SOL2 for controlling the damper clutch pressure control valve 8 according to an electrical signal of a transmission control unit TCU, and a lock-up switching valve 10. Therefore, the launch control portion B utilizes a torque multiplication effect of a torque converter TC under acceleration and reduces line pressure at a high speed condition in order to enhance fuel consumption.

In addition, the first pressure reduction control portion C includes a first reducing valve 12. The first reducing valve 12 reduces hydraulic pressure received from the line regulator valve 4 and supplies control pressure to each proportional control solenoid valve VFS1, VFS2, VFS3, VFS4, SOL1, and SOL2. The second pressure reduction control portion D includes a second reducing valve 14. The second reducing valve 14 reduces the hydraulic pressure received from the line regulator valve 4 and supplies control pressure to first, second, third, and fourth pressure switching valves 20, 26, 34, and 46, and first, second, and third on/off solenoid valves SS-A, SS-B, and SS-C controlled by the first, second, third, and fourth proportional control solenoid valves VFS1, VFS2, VFS3, and VFS4.

The manual shifting control portion E includes a manual valve 16 that enables conversion of hydraulic paths according to manual shifting of a driver.

The first clutch/second clutch control portion F includes a first pressure control valve 18 integrally formed with the first proportional control solenoid valve VFS1, the first pressure switching valve 20 controlled by control pressure of the first proportional control solenoid valve VFS1 and the second reducing valve 14 and supplying a part of output pressure of the first pressure control valve 18 back to the first pressure control valve 18 as control pressure thereof, and a first switching valve 22 controlled by the first on/off solenoid valve SS-A and enabling conversion of a hydraulic path in order to selectively supply operating hydraulic pressure to the first clutch C1 or the second clutch C2.

The third clutch control portion G includes a second pressure control valve 24 integrally formed with the second proportional control solenoid valve VFS2, the second pressure switching valve 26 controlled by control pressure of the second proportional control solenoid valve VFS2 and the second reducing valve 14 and supplying a part of output pressure of the second pressure control valve 24 back to the second pressure control valve 24 as control pressure thereof, a second switching valve 28 relaying hydraulic pressure received from the second pressure control valve 24 to a fail-safe valve 30, and the fail-safe valve 30 supplying operating hydraulic pressure received from the second switching valve 28 to the third clutch C3 according to control pressure received through three different routes.

The fourth clutch/first brake control portion H includes a third pressure control valve 32 integrally formed with the third proportional control solenoid valve VFS3, the third pressure switching valve 34 controlled by control pressure of the third proportional control solenoid valve VFS3 and the second reducing valve 14 and supplying a part of output pressure of the third pressure control valve 32 back to the third pressure control valve 32 as control pressure thereof, a third switching valve 36 enabling conversion of a hydraulic path according to control pressure of the second on/off solenoid valve SS-B and selectively supplying hydraulic pressure received from the third pressure control valve 32 to the fourth clutch C4 or the first brake B1, a fourth switching valve 38 selectively supplying hydraulic pressure received from the third switching valve 36 or reverse range pressure to the first brake B1, and a fifth switching valve 40 supplying line pressure to the third pressure control valve 32 by control of the third on/off solenoid valve SS-C and supplying the reverse range pressure to the fourth switching valve 38.

The second brake control portion I includes a fourth pressure control valve 44 integrally formed with the fourth proportional control solenoid valve VFS4, the fourth pressure switching valve 46 controlled by control pressure of the fourth proportional control solenoid valve VFS4 and the second reducing valve 14 and supplying a part of output pressure of the fourth pressure control valve 44 back to the fourth pressure control valve 44 as control pressure thereof, and a shuttle valve 48 selectively supplying operating hydraulic pressure of the second brake B2 or the fourth clutch C4 to the fail-safe valve 30 or the fourth switching valve 38 as control pressure thereof.

In more detail, as shown in FIG. 3, the manual valve 16 selectively supplies the hydraulic pressure, received from a line pressure line 50 connected to the line regulator valve 4, to a forward range pressure line 52 or a reverse range pressure line 54 according to a change in drive ranges.

The forward range pressure line 52 is connected to the first and second pressure control valves 18 and 24 and the third pressure switching valve 34, and the reverse range pressure line 54 is connected to the fifth switching valve 40.

Figure 4:
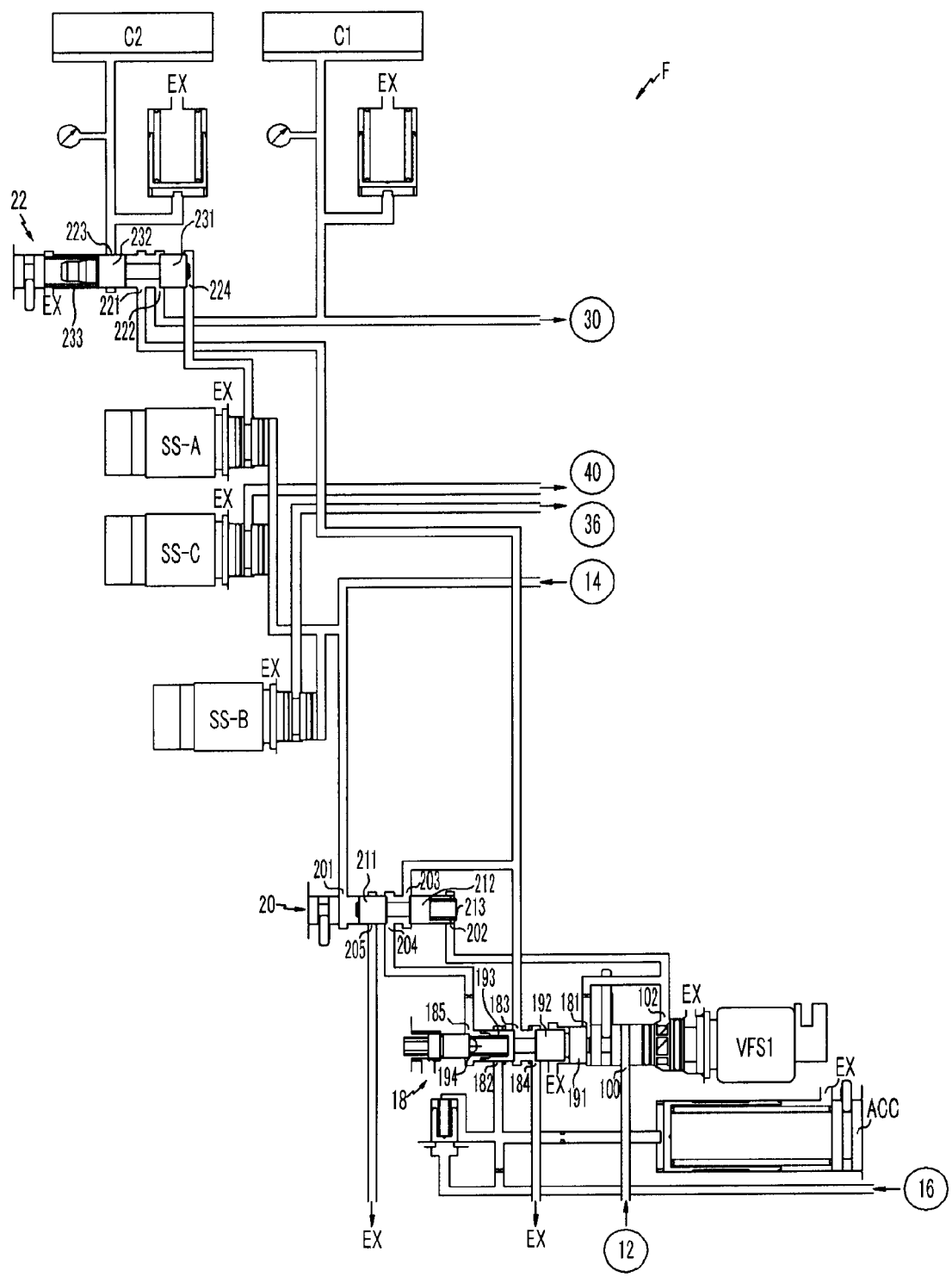
FIG. 4 is a detailed diagram of a first clutch/second clutch control portion according to an exemplary embodiment of the present invention.

FIG. 4 is a detailed diagram of a first clutch/second clutch control portion F shown in FIG. 3 according to an exemplary embodiment of the present invention. The first proportional control solenoid valve VFS1 includes an input port 100 receiving the control pressure of the first reducing valve 12 and an output port 102 supplying hydraulic pressure received from the input port 100 to the first pressure control valve 18 and the first pressure switching valve 20.

A valve body of the first pressure control valve 18 integrally formed with the first proportional control solenoid valve VFS1 includes a first port 181 receiving the control pressure from the first proportional control solenoid valve VFS1, a second port 182 receiving forward range pressure from the manual valve 16, a third port 183 supplying hydraulic pressure received through the second port 182 to the first switching valve 22, a fourth port 184 exhausting hydraulic pressure of the third port 183, and a fifth port 185 receiving a part of hydraulic pressure of the third port 183 through the first pressure switching valve 20.

A valve spool mounted in the valve body includes a first land 191 receiving control pressure of the first port 181, a second land 192 selectively opening or closing the fourth port 184, and a third land 193, cooperatively with the second land 192, selectively enabling fluid communication of the second port 182 and the third port 183. An elastic member 194 is disposed between the third land 183 and the valve body, and always pushes the valve spool to the right direction in the drawing.

Therefore, the first pressure control valve 18 supplies the hydraulic pressure received from the second port 182 to the first switching valve 22 through the third port 183 according to the control pressure of the first proportional control solenoid valve VFS1 and elastic force of the elastic member 194.

A valve body of the first pressure switching valve 20 includes a first port 201 receiving the control pressure of the second reducing valve 14, a second port 202 disposed at an opposite side of the first port 201 and receiving the control pressure from the first proportional control solenoid valve VFS1, a third port 203 receiving a part of hydraulic pressure supplied to the third port 183 of the first pressure control valve 18, a fourth port 204 connected to the fifth port 185 of the first pressure control valve 18, and a fifth port 205 selectively enabling hydraulic communication with the fourth port 204 by the first land 211.

A valve spool mounted in the valve body includes the first land 211 receiving the control pressure through the first port 201 and selectively opening or closing the fifth port 205, and a second land 212 selectively opening or closing the third port 203 according to the control pressure applied through the second port 202 and selectively enabling fluid communication of the fourth and fifth ports 204 and 205, cooperatively with the first land 211. An elastic member 213 is disposed between the second land 212 and the rear portion of the valve body, and always pushes the valve spool to the left direction in the drawing.

When an ignition switch (not shown) is turned off, the valve spool of the first pressure switching valve 20 is moved to the right direction in the drawing. However, when the ignition switch is turned on, the first proportional control solenoid valve VFS1 is operated and the valve spool of the first pressure switching valve 20 is moved to the left direction in the drawing by the control pressure supplied through the second port 202 from the output port 102 of the first proportional control solenoid valve VFS1. Therefore, the first port 201 and the third port 203 are closed and the fourth and fifth ports 204 and 205 are fluidly communicated with each other to exhaust the operation oil. If the first proportional control solenoid valve VFS1 is not operated, the valve spool of the first pressure switching valve 20 is moved to the right direction in the drawing by the control pressure supplied through the first port 201 and thus enables to communicate fluidly the third port 203 with the fourth port 204.

A valve body of the first switching valve 22, which supplies hydraulic pressure received from the first pressure control valve 18 to the first clutch C1 or the second clutch C2, includes a first port 221 being fluidly communicated with the third port 183 of the first pressure control valve 18, a second port 222 supplying the hydraulic pressure received through the first port 221 to the first clutch C1 as operating hydraulic pressure thereof, a third port 223 supplying the hydraulic pressure received through the first port 221 to the second clutch C2 as operating hydraulic pressure thereof, and a fourth port 224 receiving control pressure from the first on/off solenoid valve SS-A.

A valve spool mounted in the valve body includes a first land 231 receiving the control pressure through the fourth port 224 from the first on/off solenoid valve SS-A and selectively opening or closing the second port 222, and a second land 232 cooperative with the first land 231, selectively fluid-communicating the first port 221 with the second port 222 or the third port 223. An elastic member 233 is disposed between the second land 232 and the valve body, and pushes the valve spool to the right direction in the drawing if operated.

When the control pressure is not supplied through the fourth port 224 from the first on/off solenoid valve SS-A, the valve spool is moved to the right direction in the drawing by an elastic force of the elastic member 233 and fluidly communicates the first and second ports 221 and 222 with each other. When the control pressure is supplied through the fourth port 224, the valve spool is moved to the left direction in the drawing and fluidly communicates the first and third ports 221 and 223 with each other.

In FIG. 4, the reference numeral ACC represents an accumulator that reduces fluctuation of hydraulic pressure.

Figure 5:
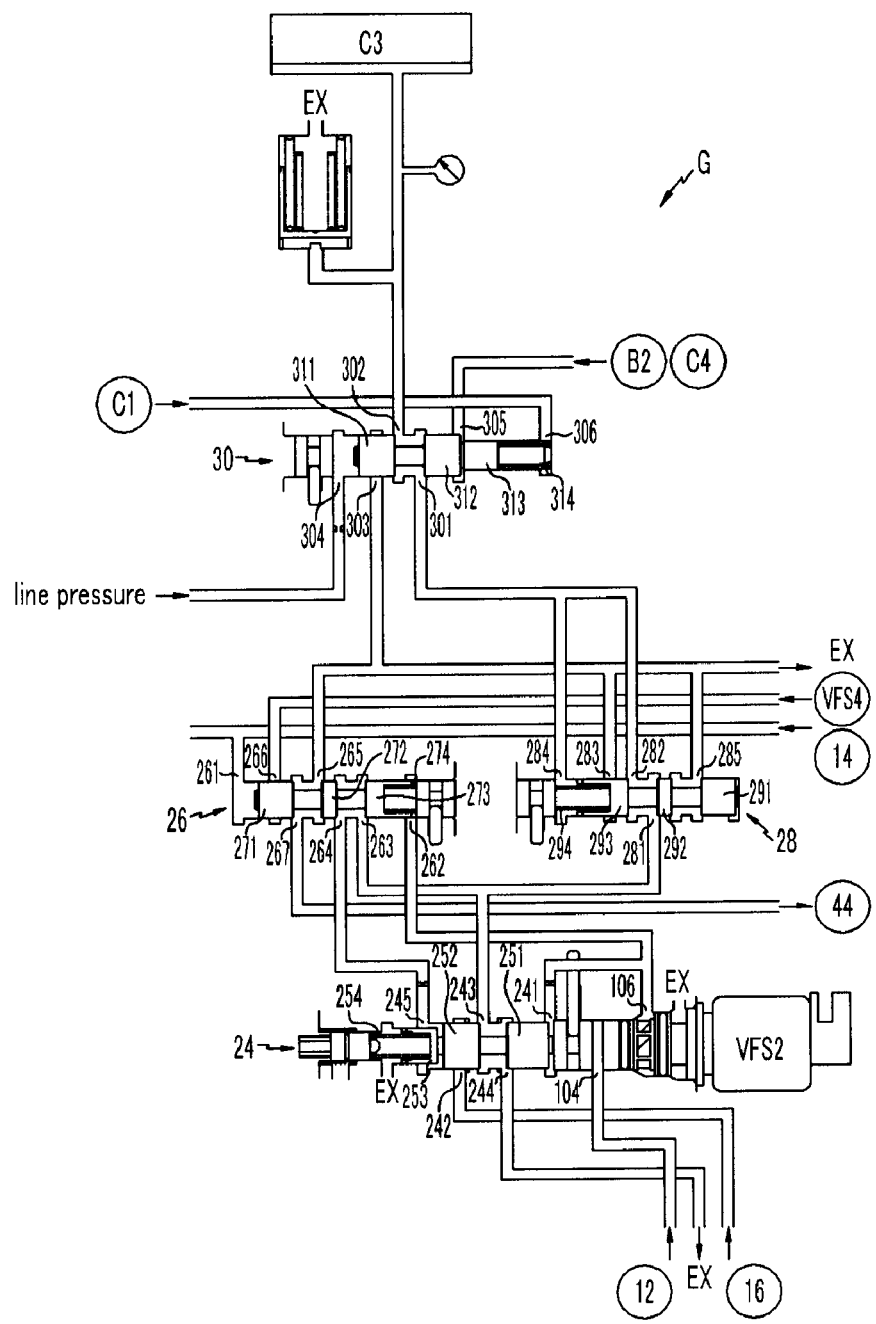
FIG. 5 is a detailed diagram of a third clutch control portion according to an exemplary embodiment of the present invention.

FIG. 5 is a detailed diagram of a third clutch control portion G shown in FIG. 3 according to an exemplary embodiment of the present invention.

The second proportional control solenoid valve VFS2 includes an input port 104 receiving the control pressure from the first reducing valve 12, and an output port 106 supplying hydraulic pressure received through the input port 104 to the second pressure control valve 24 and the second pressure switching valve 26.

A valve body of the second pressure control valve 24 integrally formed with the second proportional control solenoid valve VFS2 includes a first port 241 receiving control pressure from the second proportional control solenoid valve VFS2, a second port 242 receiving the forward range pressure from the manual valve 16, a third port 243 supplying hydraulic pressure received through the second port 242 from the manual valve 16 to the second pressure switching valve 26 and the second switching valve 28, a fourth port 244 exhausting hydraulic pressure of the third port 243, and a fifth port 245 receiving a part of the hydraulic pressure supplied to the second pressure switching valve 26.

A valve spool mounted in the valve body includes a first land 251 receiving the control pressure through the first port 241, a second land 252 cooperative with the first land 251, selectively opening or closing the fourth port 244, and a third land 253 cooperative with the second land 252, selectively fluid-communicating the second port 242 with the third port 243. An elastic member 254 is disposed between the third land 253 and the valve body, and pushes the valve spool to the right direction in the drawing if operated.

Therefore, the second pressure control valve 24 supplies the hydraulic pressure received through the second port 242 to the second pressure switching valve 26 and the second switching valve 28 through the third port 243 according to the control pressure of the second proportional control solenoid valve VFS2 and an elastic force of the elastic member 254.

A valve body of the second pressure switching valve 26 includes a first port 261 receiving the control pressure from the second reducing valve 14, a second port 262 disposed at an opposite side of the first port 261 and receiving the control pressure of the second proportional control solenoid valve VFS2, a third port 263 receiving a part of hydraulic pressure supplied from the second pressure control valve 24, a fourth port 264 connected to the fifth port 245 of the second pressure control valve 24, a fifth port 265 being selectively fluid-communicated with the fourth port 264, a sixth port 266 being fluidly communicated with an output port of the fourth proportional control solenoid valve VFS4, and a seventh port 267 being selectively fluid-communicated with the fifth port 265 or the sixth port 266.

The valve spool mounted in the valve body includes a first land 271 receiving control pressure through the first port 261 from the second reducing valve 14, a second land 272 selectively fluid-communicating the fourth and fifth ports 264 and 265 with each other, and a third land 273 receiving control pressure through the second port 262 from the second proportional control solenoid valve VFS2 and selectively opening or closing the third port 263. An elastic member 274 is disposed between the third land 273 and the valve body, and pushes the valve spool to the left direction in the drawing if operated.

When the ignition switch (not shown) is turned on, the valve spool of the second pressure switching valve 26 is moved to the right direction in the drawing. In this state, if the second proportional control solenoid valve VFS2 is operated, the valve spool of the second pressure switching valve 26 is moved to the left direction in the drawing, closes the third port 263, fluidly communicates the fourth and fifth ports 264 and 265 with each other, and fluidly communicates the sixth port 266 with the seventh port 267. In this state, if the second proportional control solenoid valve VFS2 is not operated, the valve spool of the second pressure switching valve 26 is moved to the right direction in the drawing by the control pressure of the first port 261, fluidly communicates the third port 263 with the fourth port 264, and fluidly communicates the fifth port 265 with the seventh port 267.

The second switching valve 28 relays hydraulic pressure from the second pressure control valve 24 to the fail-safe valve 30. A valve body of the second switching valve 28 includes a first port 281 receiving the forward range pressure from the second pressure control valve 24, a second port 282 supplying hydraulic pressure received through the first port 281 to the fail-safe valve 30, a third port 283 exhausting hydraulic pressure of the second port 282, a fourth port 284 receiving a part of hydraulic pressure supplied to the fail-safe valve 30 through the second port 282 as control pressure of the second switching valve 28, and a fifth port 285 connected to an exhaust line.

A valve spool mounted in the valve body includes a first land 291 selectively opening or closing the fifth port 285, a second land 292 cooperative with the first land 291, selectively fluid-communicating the first port 281 with the second port 282, and a third land 293 cooperative with the second land 292, selectively fluid-communicating the second port 282 with the first port 281 or the third port 283. An elastic member 294 is disposed between the third land 293 and the valve body, and pushes the valve spool to the right direction in the drawing if operated.

Therefore, the second switching valve 28 relays the hydraulic pressure supplied through the first port 281 to the fail-safe valve 30.

A valve body of the fail-safe valve 30 includes a first port 301 receiving operating hydraulic pressure of the third clutch C3 from the second switching valve 28, a second port 302 supplying hydraulic pressure received through the first port 301 to the third clutch C3, a third port 303 exhausting hydraulic pressure of the second port 302, a fourth port 304 receiving the line pressure as control pressure of the fail-safe valve 30, a fifth port 305 receiving a part of operating hydraulic pressure of the fourth clutch C4 or the second brake B2 as control pressure of the fail-safe valve 30, and a sixth port 306 receiving operating hydraulic pressure of the first clutch C1 as control pressure of the fail-safe valve 30.

A valve spool mounted in the valve body of the fail-safe valve 30 includes a first land 311 receiving control pressure through the fourth port 304 and selectively opening or closing the third port 303, a second land 312 receiving control pressure through the fifth port 305 and selectively fluid-communicating the second port 302 with the first port 301 or the third port 303, cooperatively with the first land 311, and a third land 313 receiving control pressure through the sixth port 306. An elastic member 314 is disposed between the third land 313 and the valve body, and pushes the valve spool to the left direction in the drawing if operated.

Figure 6:
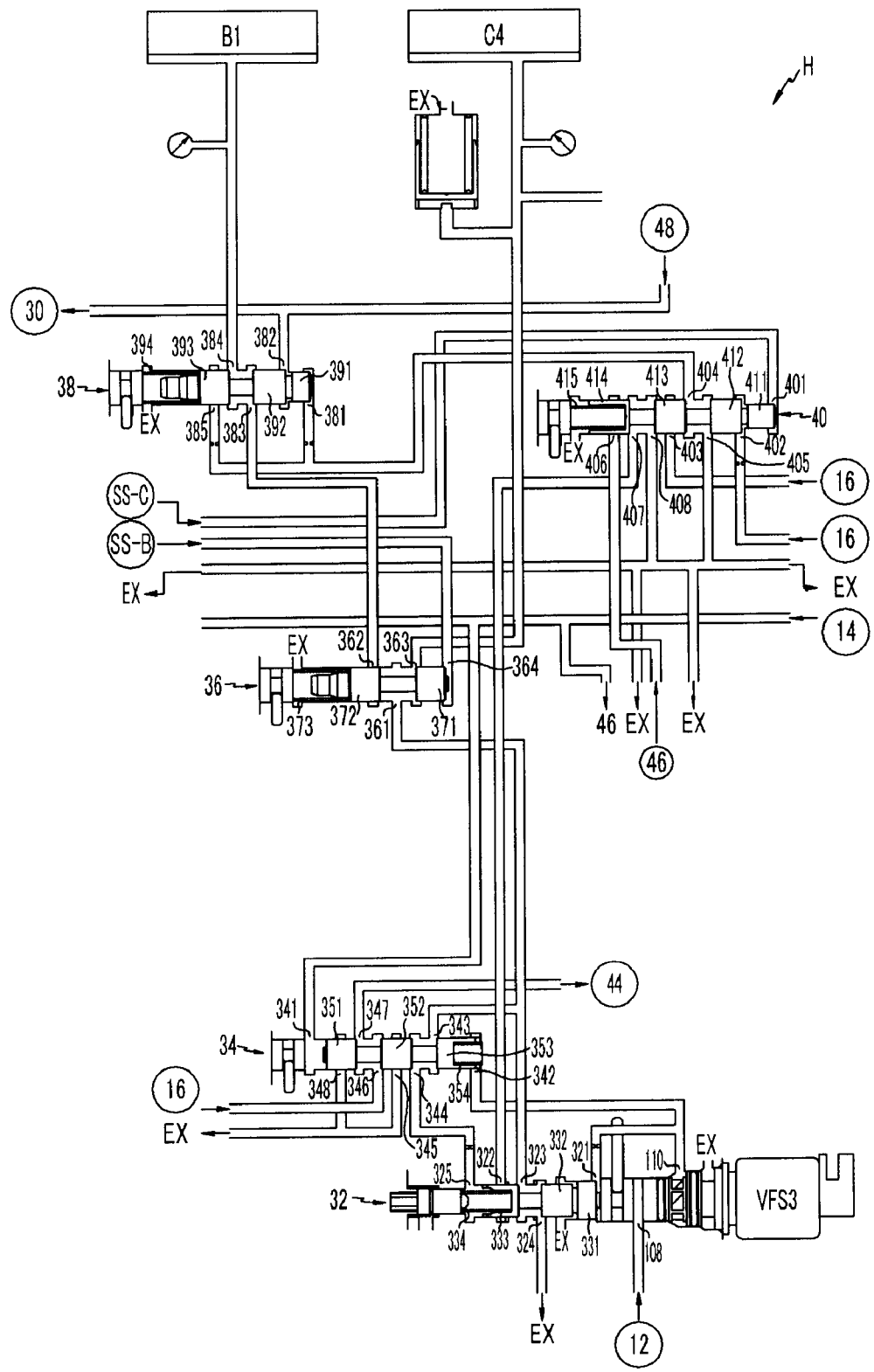
FIG. 6 is a detailed diagram of a fourth clutch/first brake control portion according to an exemplary embodiment of the present invention.

FIG. 6 is a detailed diagram of a fourth clutch/first brake control portion H according to an exemplary embodiment of the present invention. The third proportional control solenoid valve VFS3 includes an input port 108 receiving the control pressure from the first reducing valve 12 and an output port 110 supplying hydraulic pressure received through the input port 108 to the third pressure control valve 32 and the third pressure switching valve 34 in a turned-on state.

A valve body of the third pressure control valve 32 integrally formed with the third proportional control solenoid valve VFS3 includes a first port 321 receiving control pressure of the third proportional control solenoid valve VFS3, a second port 322 receiving the line pressure from the fifth switching valve 40, a third port 323 supplying hydraulic pressure received through the second port 322 to the third switching valve 36, a fourth port 324 exhausting hydraulic pressure of the third port 323, and a fifth port 325 receiving a part of hydraulic pressure supplied to the third switching valve 36 through the third pressure switching valve 34.

A valve spool mounted in the valve body of the third pressure control valve 32 includes a first land 331 receiving control pressure from the first port 321, a second land 332 selectively opening or closing the fourth port 324, and a third land 333, cooperatively with the second land 332, selectively fluid-communicating the second port 322 with the third port 323. An elastic member 334 is disposed between the third land 333 and the valve body and pushes the valve spool to the right direction in the drawing.

Therefore, the third pressure control valve 32 controls hydraulic pressure received through the second port 322, and supplies it to the third switching valve 36 through the third port 323 by the control pressure of the third proportional control solenoid valve VFS3 and elastic force of the elastic member 334.

A valve body of the third pressure switching valve 34 includes a first port 341 receiving control pressure from the second reducing valve 14, a second port 342 disposed at an opposite side of the first port 341 and receiving control pressure from the third proportional control solenoid valve VFS3, a third port 343 receiving a part of hydraulic pressure supplied to the third switching valve 36 from the third pressure control valve 32, a fourth port 344 connected to the fifth port 325 of the third pressure control valve 32, a fifth port 345 being selectively fluid-communicated with the fourth port 344 and exhausting hydraulic pressure of the fourth port 344, a sixth port 346 receiving the forward range pressure from the manual valve 16, a seventh port 347 selectively supplying the forward range pressure of the sixth port 346 to the fourth pressure control valve 44, and an eighth port 348 being selectively fluid-communicated with the seventh port 347 and exhausting the hydraulic pressure of the seventh port 347.

A valve spool mounted in the valve body of the third pressure switching valve 34 includes a first land 351 receiving control pressure through the first port 341 and opening or closing the eighth port 348, a second land 352 cooperative with the first land 351, selectively fluid-communicating the seventh port 347 with the sixth port 346 or the eighth port 348, and a third land 353 receiving control pressure through the second port 342 such that the third land 353 selectively opens or closes the third port 343 and selectively fluid-communicates the fourth and fifth ports 344 and 345 with each other, cooperatively with the second land 352. An elastic member 354 is disposed between the third land 353 and the valve body, and pushes the valve spool to the left direction in the drawing.

When the ignition switch is turned on, the valve spool of the third pressure switching valve 34 is moved to the right direction in the drawing. In this state, if the third proportional control solenoid valve VFS3 is operated, the valve spool is moved to the left direction in the drawing, closes the third port 343, fluidly communicates the fourth and fifth ports 334 and 335 with each other, and fluidly communicates the seventh port 337 with the eighth port 338. If the third proportional control solenoid valve VFS3 is not operated, the valve spool is moved to the right direction in the drawing, fluidly communicates the third port 343 with the fourth port 344, and fluidly communicates the sixth port 346 with the seventh port 347 by control pressure received through the first port 341.

A valve body of the third switching valve 36, which selectively supplies hydraulic pressure received from the third pressure control valve 32 to the fourth clutch C4 or the first brake B1 through the fourth switching valve 38, includes a first port 361 receiving hydraulic pressure from the third pressure control valve 32, a second port 362 supplying hydraulic pressure received through first port 361 to the fourth switching valve 38, a third port 363 supplying hydraulic pressure received through the first port 361 to the fourth clutch C4, and a fourth port 364 receiving the control pressure of the second on/off solenoid valve SS-B.

A valve spool mounted in the valve body of the third switching valve 36 includes a first land 371 receiving control pressure through the fourth port 364 and opening or closing the third port 363, and a second land 372 cooperative with the first land 371, selectively fluid-communicating the first port 361 with the second port 362 or the third port 363. An elastic member 373 is disposed between the second land 372 and the valve body, and pushes the valve spool to the right direction in the drawing if operated.

Therefore, when the second on/off solenoid valve SS-B is not operated, the valve spool is moved to the right direction in the drawing by elastic force of the elastic member 373 and fluidly communicates the first and third ports 361 and 363 with each other such that hydraulic pressure received from the third pressure control valve 32 is supplied to the fourth clutch C4 as operating hydraulic pressure thereof. On the contrary, when the third switching valve 36 receives control pressure from the second on/off solenoid valve SS-B, the valve spool is moved to the left direction in the drawing and fluidly communicates the first port 361 with the second port 362 such that hydraulic pressure received from the third pressure control valve 32 is supplied to the first brake B1 through the fourth switching valve 38.

The fourth switching valve 38 supplies the forward range pressure received through the third switching valve 36 to the first brake B1 at the forward speed, and supplies the reverse range pressure to the first brake B1 at the reverse speed.

A valve body of the fourth switching valve 38 includes a first port 381 receiving the reverse range pressure as control pressure of the fourth switching valve 38, a second port 382 receiving the operating hydraulic pressure of the fourth clutch C4 or the second brake B2 via a shuttle valve 48 as control pressure of the fourth switching valve 38, a third port 383 receiving hydraulic pressure from the third switching valve 36, a fourth port 384 supplying hydraulic pressure received through the third port 383 to the first brake B1, and a fifth port 385 receiving the reverse range pressure.

A valve spool mounted in the valve body of the fourth switching valve 38 includes a first land 391 receiving control pressure through the first port 381, a second land 392 receiving control pressure through the second port 382 and opening or closing the third port 383, and a third land 393 cooperative with the second land 392, selectively fluid-communicating the fourth port 384 with the third port 383 or the fifth port 385. An elastic member 394 is disposed between the third land 393 and the valve body and pushes the valve spool to the right direction in the drawing.

Therefore, when control pressure is supplied through the first port 381 at the reverse speed, the valve spool is moved to the left direction in the drawing and supplies the reverse range pressure received through the fifth port 385 to the fourth port 384.

A valve body of the fifth switching valve 40 includes a first port 401 receiving control pressure from the third on/off solenoid valve SS-C, a second port 402 receiving the reverse range pressure from the manual valve 16 as control pressure thereof, a third port 403 receiving the reverse range pressure from the manual valve 16, a fourth port 404 supplying the reverse range pressure received through the third port 403 to the fourth switching valve 38, a fifth port 405 exhausting hydraulic pressure received from the fourth port 404, a sixth port 406 receiving the line pressure from the fourth pressure switching valve 46, a seventh port 407 supplying the line pressure received through the sixth port 406 to the third pressure control valve 32, and an eighth port 408 exhausting hydraulic pressure received from the seventh port 407.

A valve spool mounted in the valve body of the fifth switching valve 40 includes a first land 411 receiving control pressure through the first port 401, a second land 412 receiving control pressure through the second port 402, a third land 413 cooperative with the second land 412, fluidly communicating the third port 403 with the fourth port 404, and a fourth land 414, cooperatively with the third land 413, selectively fluid-communicating the sixth port 406 with the seventh port 407. An elastic member 415 is disposed between the fourth land 414 and the valve body, and pushes the valve spool to the right direction in the drawing if operated.

Therefore, the fifth switching valve 40 supplies the line pressure supplied through the fourth pressure switching valve 46 to the third pressure control valve 32 by control of the third on/off solenoid valve SS-C at third, fifth, and eighth forward speeds, and supplies the reverse range pressure to the fourth switching valve 38 by control of the reverse range pressure at the reverse speed.

Figure 7:
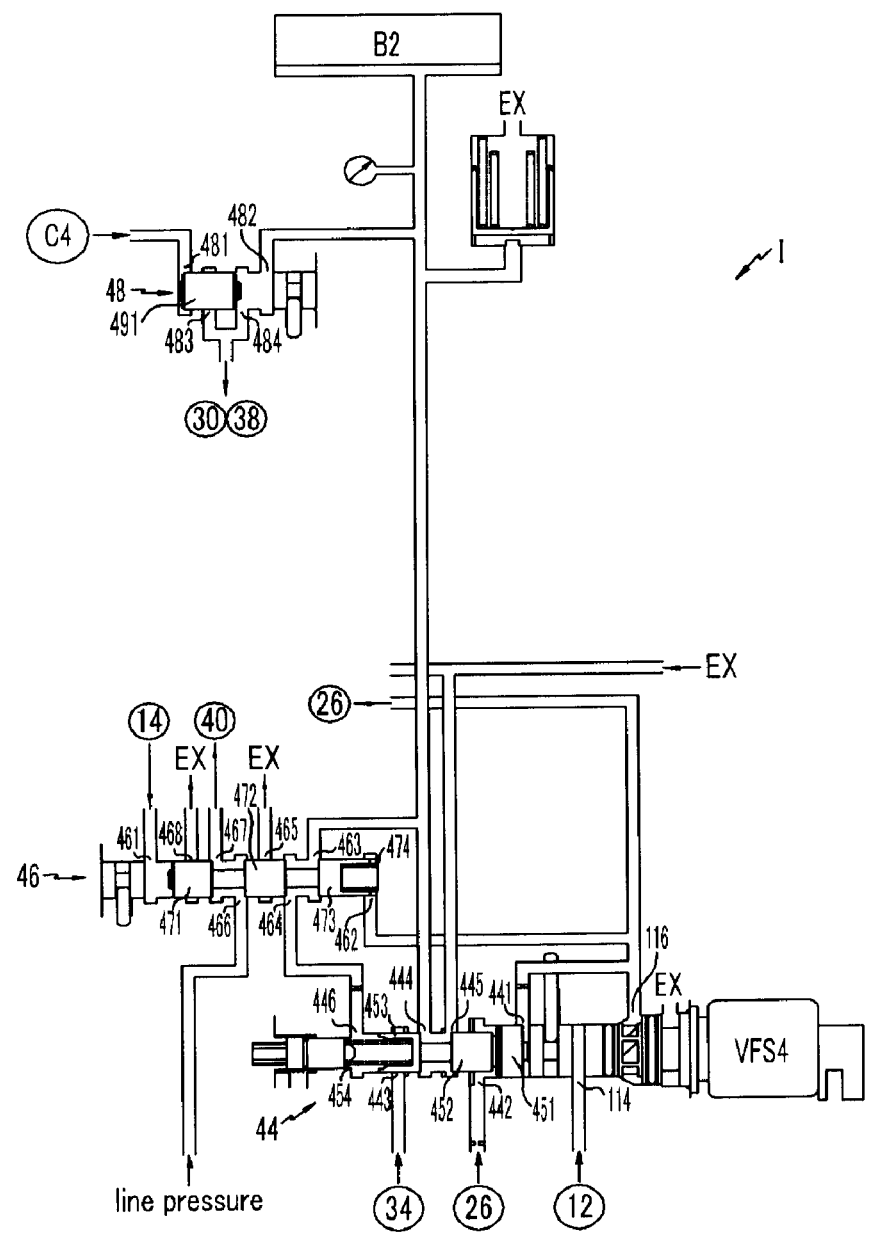
FIG. 7 is a detailed diagram of a second brake control portion according to an exemplary embodiment of the present invention.

FIG. 7 is a detailed diagram of a second brake control portion I according to an exemplary embodiment of the present invention. The fourth proportional control solenoid valve VFS4 includes an input port 114 receiving the control pressure of the first reducing valve 12, and an output port 116 supplying hydraulic pressure received through the input port 114 to the fourth pressure control valve 44 and the second pressure switching valve 26 in a turned-off state.

A valve body of the fourth pressure control valve 44 that is integrally formed with the fourth proportional control solenoid valve VFS4 includes a first port 441 receiving control pressure of the fourth proportional control solenoid valve VFS4, a second port 442 connected to the second pressure switching valve 26, a third port 443 receiving hydraulic pressure from the third pressure switching valve 34, a fourth port 444 supplying hydraulic pressure received through the third port 443 to the second brake B2, a fifth port 445 exhausting hydraulic pressure of the fourth port 444, and a sixth port 446 receiving control pressure from the fourth pressure switching valve 46.

A valve spool mounted in the valve body of the fourth pressure control valve 44 includes a first land 451 receiving control pressure through the first port 441, a second land 452 receiving control pressure through the second port 442, and a third land 453 cooperative with the second land 452, selectively fluid-communicating the fourth port 444 with the third port 443 or the fifth port 445. An elastic member 454 is disposed between the third land 453 and the valve body, and pushes the valve spool to the right direction in the drawing if operated.

Therefore, the valve spool controls hydraulic pressure received through the third port 443 according to control pressure of the fourth proportional control solenoid valve VFS4 and elastic force of the elastic member 444, and supplies the hydraulic pressure to the second brake B2 as operating hydraulic pressure thereof through the fourth port 444.

A valve body of the fourth pressure switching valve 46 includes a first port 461 receiving the control pressure of the second reducing valve 14, a second port 462 disposed at an opposite side of the first port 461 and receiving control pressure from the fourth proportional control solenoid valve VFS4, a third port 463 receiving a part of hydraulic pressure supplied from the fourth pressure control valve 44 to the second brake B2, a fourth port 464 connecting the third port 463 to the sixth port 446 of the fourth pressure control valve 44, a fifth port 465 exhausting hydraulic pressure received through the fourth port 464, a sixth port 466 receiving the line pressure, a seventh port 467 selectively supplying the line pressure received through the sixth port 466 to the fifth switching valve 40, and an eighth port 468 exhausting hydraulic pressure of the seventh port 467.

A valve spool mounted in the valve body includes a first land 471 receiving control pressure through the first port 461 and opening or closing the eighth port 468, a second land 472 cooperative with the first land 471, selectively fluid-communicating the seventh port 467 with the sixth port 466 or the eighth port 468, and a third land 473 receiving control pressure through the second port 462, selectively opening or closing the third port 463, and simultaneously selectively fluid-communicating, cooperatively with the second land 472, the fourth port 464 with the third port 463 or the fifth port 465. An elastic member 474 is disposed between the third land 473 and the valve body, and pushes the valve spool to the left direction in the drawing if operated.

A valve body of the shuttle valve 48, which supplies a part of operating hydraulic pressure of the fourth clutch C4 or the second brake B2 to the fail-safe valve 30 and the fourth switching valve 38 as control pressure thereof, includes a first port 481 fluidly communicated with the fourth clutch C4, a second port 482 fluidly communicated with the second brake B2, a third port 483 selectively fluid-communicated with the first port 481, and a fourth port 484 selectively fluid-communicated with the second port 482. The third port 483 and the fourth port 484 may form one joined output port as shown in FIGS. 3 and 7.

A valve spool mounted in the valve body of the shuttle valve 48 includes only one land 491. One end of the land 491 receives control pressure through the first port 481 and fluidly communicates the first port 481 with the third port 483 selectively, and the other end of the land 491 receives control pressure through the second port 482 selectively and fluidly communicates the second port 482 with the fourth port 484. Therefore, a part of the operating hydraulic pressure of the fourth clutch C4 or the second brake B2 is selectively supplied to the fail-safe valve 30 and the fourth switching valve 38 as control pressure thereof.

Figure 8:
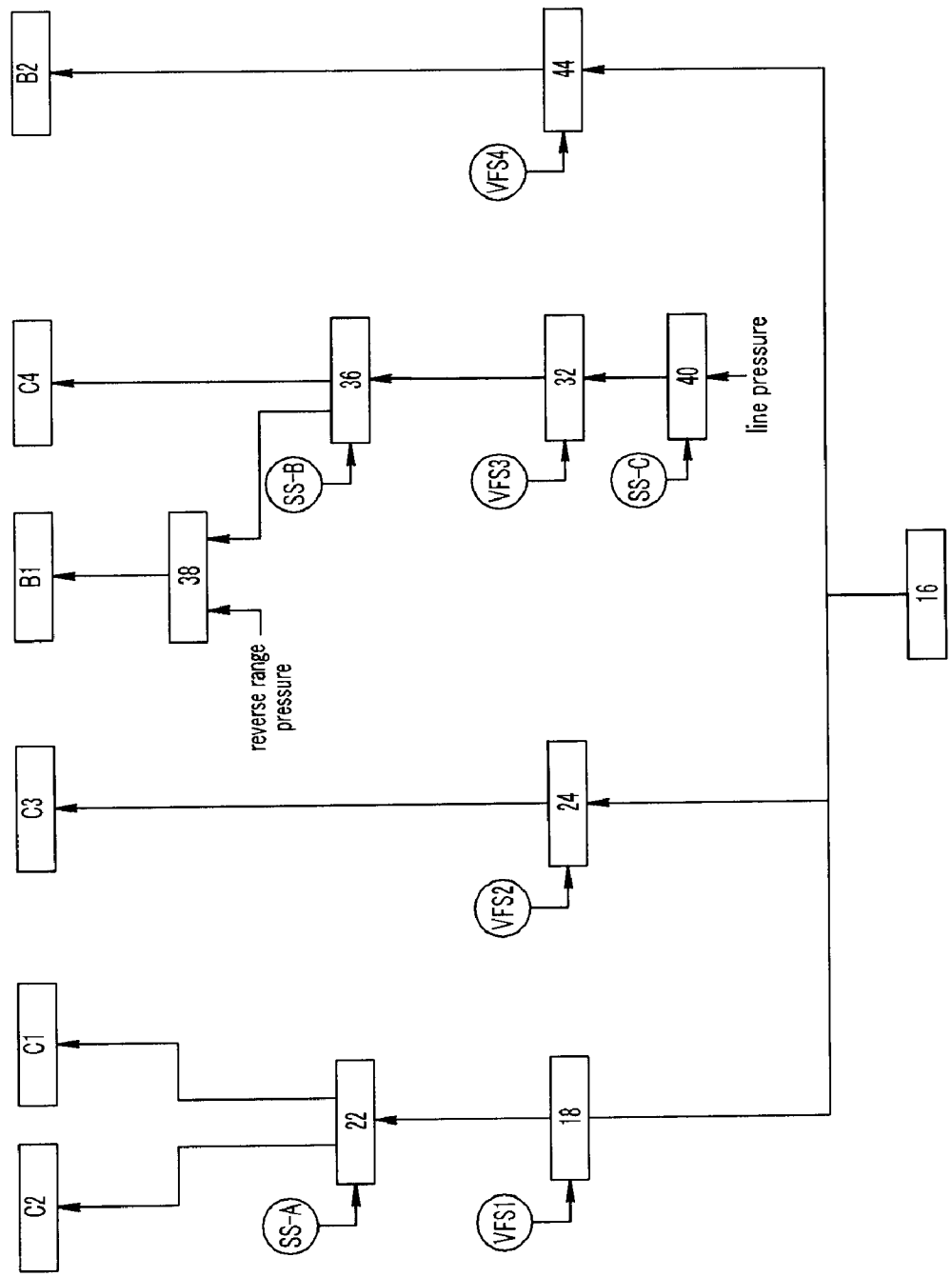
FIG. 8 is a brief block diagram of a hydraulic control system according to an exemplary embodiment of the present invention.

Referring to FIG. 8, operation of the hydraulic control system of an eight-speed automatic transmission for vehicles will be described.

The first pressure control valve 18 controlled by the first proportional control solenoid valve VFS1 is connected to the manual valve 16, receives the forward range pressure, and supplies the forward range pressure to the first switching valve 22. The first switching valve 22 controlled by the first on/off solenoid valve SS-A selectively supplies hydraulic pressure received from the first pressure control valve 18 to the first clutch C1 or the second clutch C2 as operating hydraulic pressure thereof.

The second pressure control valve 24 controlled by the second proportional control solenoid valve VFS2 is connected to the manual valve 16 so as to receive the forward range pressure, and is connected to the third clutch C3 so as to supply operating hydraulic pressure thereto.

Here, the second pressure control valve 24 is not directly connected to the third clutch C3, but output of the second pressure control valve 24 is transmitted to the third clutch C3.

The third pressure control valve 32 controlled by the third proportional control solenoid valve VFS3 does not receive the forward range pressure from the manual valve 16, but receives the line pressure through the fifth switching valve 40. The fifth switching valve 40 is controlled by the third on/off solenoid SS-C. In addition, the third pressure control valve 32 controls the line pressure and supplies it to the third switching valve 36.

In this case, the hydraulic path in the third switching valve 36 is converted by control of the second on/off solenoid valve SS-B such that hydraulic pressure received from the third pressure control valve 32 is directly supplied to the fourth clutch C4 or is supplied to the first brake B1 through the fourth switching valve 38.

The fourth switching valve 38 interposed between the third switching valve 36 and the first brake B1 supplies the reverse range pressure to the first brake B1 at the reverse speed.

The fourth pressure control valve 44 controlled by the fourth proportional control solenoid valve VFS4 receives the forward range pressure from the manual valve 16 and directly supplies it to the second brake B2 as operating hydraulic pressure thereof.

In the hydraulic control system according to an exemplary embodiment of the present invention, the first, second and third on/off solenoid valves and the first, second, third and fourth proportional control solenoid valves are operated according to the following Table 1 for respective speeds.

TABLE 1

|     | SS-A | SS-B | SS-C | VFS1 | VFS2 | VFS3 | VFS4 |
|-----|------|------|------|------|------|------|------|
| 1ST |      |      |      | •    |      |      |      |
| 2ND |      |      |      | •    |      |      | •    |
| 3RD |      |      | •    | •    |      | •    |      |
| 4TH |      |      |      | •    | •    | •    |      |
| 5TH |      |      | •    | •    | •    | •    |      |
| 6TH | •    |      |      | •    | •    | •    |      |
| 7TH |      |      |      | •    | •    |      | •    |
| 8TH |      | •    | •    |      | •    | •    |      |
| REV |      |      | •    |      |      | •    |      |

Hereinafter, an operation of the hydraulic control system according to an exemplary embodiment of the present invention will be described in detail.

[The First Forward Speed]

Figure 9:
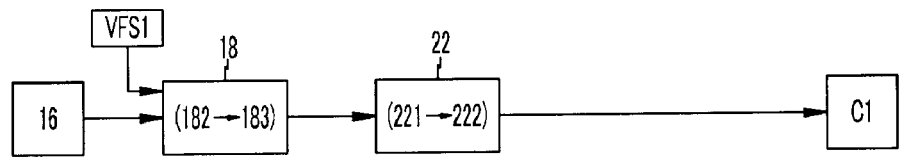
FIG. 9 is a block diagram of a hydraulic control system at a first forward speed according to an exemplary embodiment of the present invention.

When the manual valve 16 is changed to the D range for starting the vehicle, as shown in FIG. 9, the forward range pressure of the manual valve 16 is controlled by the first pressure control valve 18 that is controlled by the first proportional control solenoid valve VFS1 and is supplied to the first clutch C1 as operating hydraulic pressure thereof through the first switching valve 22. In this case, the one-way clutch F1 is automatically operated.

[The Second Forward Speed]

When the vehicle speed increases in such a state of the first forward speed where the first clutch C1 is operated, a transmission control unit (not shown) controls the fourth proportional control solenoid valve VFS4 to be operated.

Figure 10:
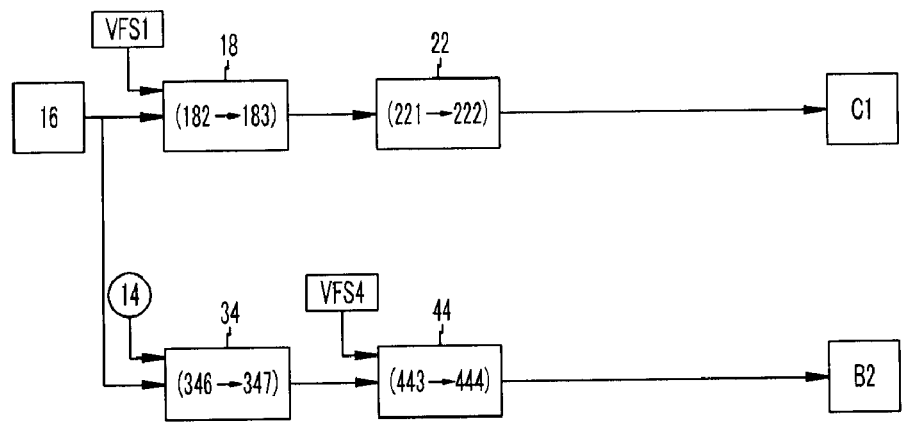
FIG. 10 is a block diagram of a hydraulic control system at a second forward speed according to an exemplary embodiment of the present invention.

In this case, as shown in FIG. 10, in a state in which the first clutch C1 is operated, the forward range pressure is supplied to the fourth pressure control valve 44 through the third pressure switching valve 34 controlled by the second pressure reduction valve 14. In addition, hydraulic pressure supplied to the fourth pressure control valve 44 is controlled by the fourth proportional control solenoid valve VFS4 and is supplied to the second brake B2. Therefore, the first clutch C1 and the second brake B2 are operated and shifting to the second forward speed is realized.

[The Third Forward Speed]

When the vehicle speed increases in such a state of the second forward speed, the transmission control unit (not shown) controls the fourth proportional control solenoid valve VFS4 to be turned off and the third proportional control solenoid valve VFS3 to be turned on.

Figure 11:
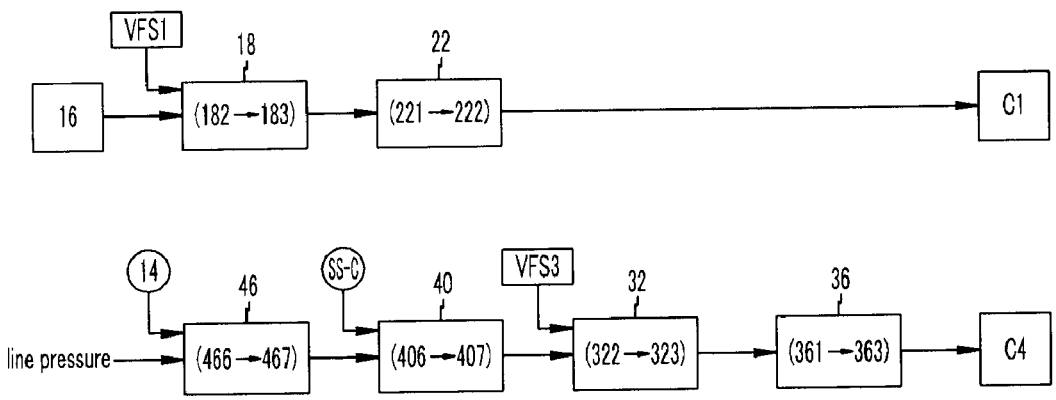
FIG. 11 is a block diagram of a hydraulic control system at a third forward speed according to an exemplary embodiment of the present invention.

In this case, the second brake B2 is released, and in the state in which the first clutch C1 is operated, the line pressure supplied to the third pressure control valve 32 through the fourth pressure switching valve 46 and the fifth switching valve 40 is supplied to the fourth clutch C4 through the third switching valve 36, as shown in FIG. 11.

In addition, the fifth switching valve 40 is controlled by the third on/off solenoid valve SS-C, and the third pressure control valve 32 is controlled by the third proportional control solenoid valve VFS3. Therefore, the first clutch C1 and the fourth clutch C4 are operated and shifting to the third forward speed is realized.

[The Fourth Forward Speed]

When the vehicle speed increases in such a state of the fourth forward speed, the transmission control unit (not shown) controls the third proportional control solenoid valve VFS3 to be turned off and the second proportional control solenoid valve VFS2 to be turned on.

Figure 12:
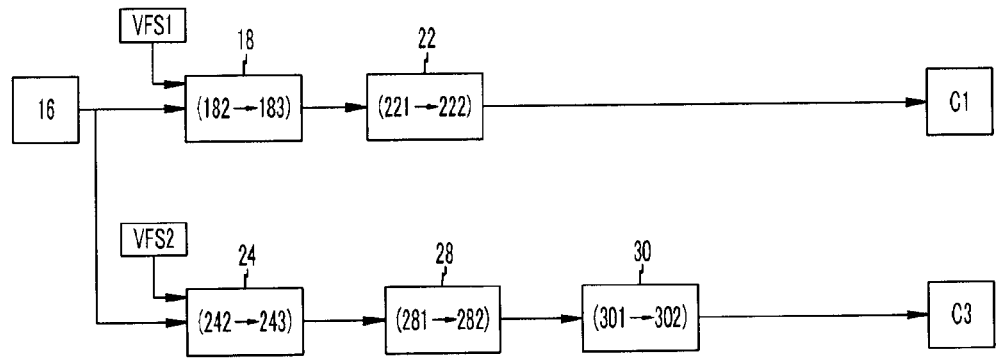
FIG. 12 is a block diagram of a hydraulic control system at a fourth forward speed according to an exemplary embodiment of the present invention.

In this case, the fourth clutch C4 that is controlled by the third proportional control solenoid valve VFS3 is released, and the forward range pressure supplied to the second pressure control valve 24 is controlled by the second proportional control solenoid valve VFS2 and is supplied to the third clutch C3 through the second switching valve 28 and the fail-safe valve 30, as shown in FIG. 12. Therefore, the first clutch C1 and the third clutch C3 are operated and shifting to the fourth forward speed is realized.

[The Fifth Forward Speed]

When the vehicle speed increases in such a state of the fourth forward speed, the transmission control unit (not shown) controls the first proportional control solenoid valve VFS1 to be turned off and the third proportional control solenoid valve VFS3 to be turned on.

In this case, the first clutch C1 is released, and in a state in which the third clutch C3 is operated, the line pressure supplied to the third pressure control valve 32 through the fourth pressure switching valve 46 and the fifth switching valve 40 is supplied to the fourth clutch C4 through the third switching valve 36.

Figure 13:
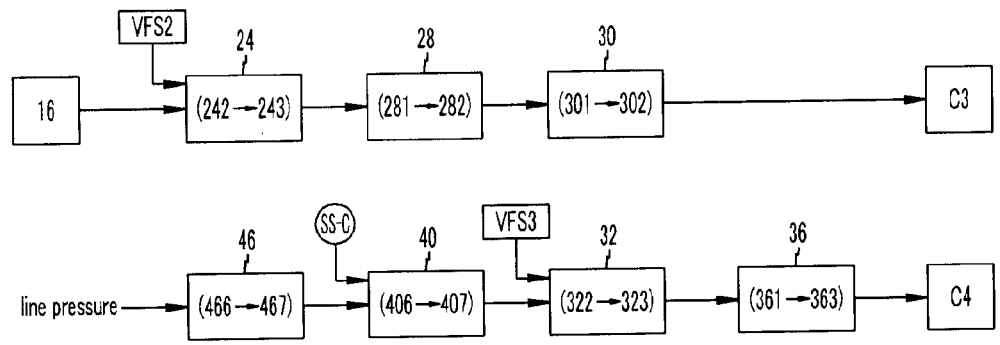
FIG. 13 is a block diagram of a hydraulic control system at a fifth forward speed according to an exemplary embodiment of the present invention.

The fifth switching valve 40 is controlled by the third on/off solenoid valve SS-C, and the third pressure control valve 32 is controlled by the third proportional control solenoid valve VFS3 as shown in FIG. 13. Therefore, the third clutch C3 and the fourth clutch C4 are operated and shifting to the fifth forward speed is realized.

[The Sixth Forward Speed]

When the vehicle speed increases in such a state of the fifth forward speed, the transmission control unit (not shown) controls the third proportional control solenoid valve VFS3 to be turned off and the first proportional control solenoid valve VFS1 to be turned on. Simultaneously, the transmission control unit controls the first on/off solenoid valve SS-A to be turned on.

Figure 14:
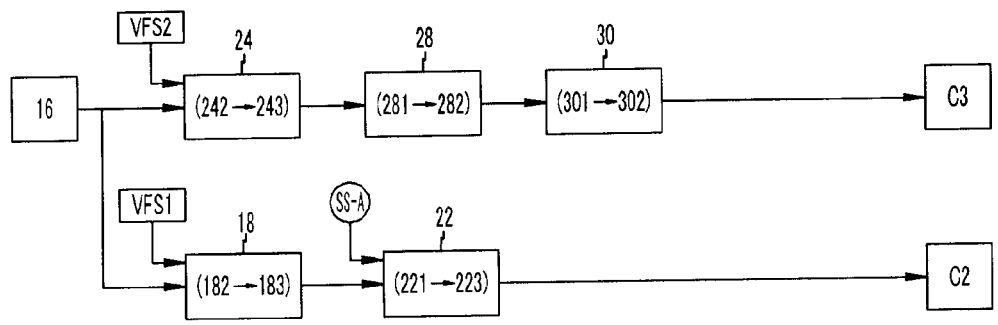
FIG. 14 is a block diagram of a hydraulic control system at a sixth forward speed according to an exemplary embodiment of the present invention.

In this case, the fourth clutch C4 is released, and hydraulic pressure of the first pressure control valve 18 is controlled by the first proportional control solenoid valve VFS1 and is supplied to the first switching valve 22, as shown in FIG. 14.

In addition, hydraulic pressure supplied to the first switching valve 22 is controlled by the first on/off solenoid valve SS-A and is supplied to the second clutch C2. Therefore, the second clutch C2 and the third clutch C3 are operated and shifting to the sixth forward speed is realized.

[The Seventh Forward Speed]

When the vehicle speed increases in such a state of the sixth forward speed, the transmission control unit (not shown) controls the first proportional control solenoid valve VFS1 and the first on/off solenoid valve SS-A to be turned off and the fourth proportional control solenoid valve VFS4 to be turned on.

Figure 15:
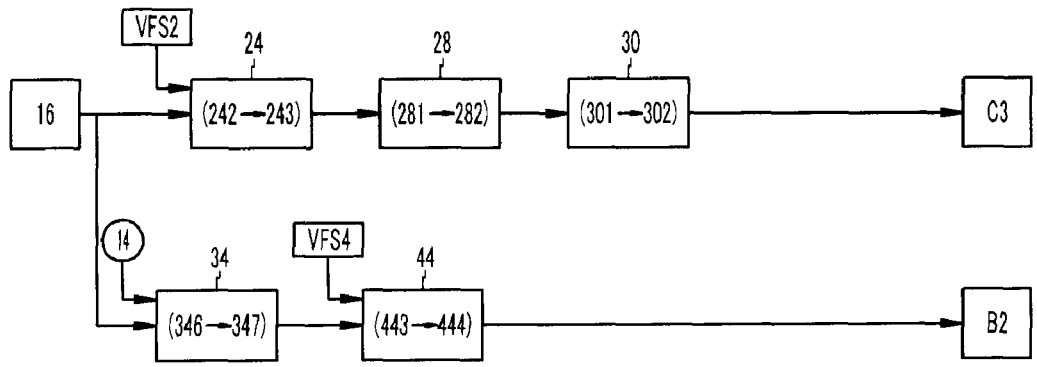
FIG. 15 is a block diagram of a hydraulic control system at a seventh forward speed according to an exemplary embodiment of the present invention.

In this case, the second clutch C2 is released, and hydraulic pressure supplied to the fourth pressure control valve 44 through the third pressure switching valve 34 is controlled by the fourth proportional control solenoid valve VFS4 and is supplied to the second brake B2, as shown in FIG. 15. The third pressure switching valve 34 is controlled by the second pressure reduction valve 14. Therefore, the third clutch C3 and the second brake B2 are operated and shifting to the seventh forward speed is realized.

[The Eighth Forward Speed]

When the vehicle speed increases in such a state of the seventh forward speed, the transmission control unit (not shown) controls the fourth proportional control solenoid valve VFS4 to be turned off and the third proportional control solenoid valve VFS3 and the second and third on/off solenoid valves SS-B and SS-C to be turned on.

Figure 16:
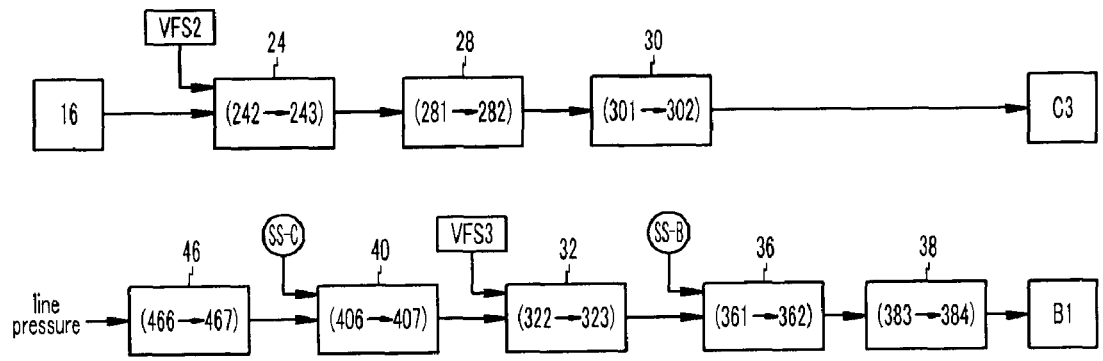
FIG. 16 is a block diagram of a hydraulic control system at an eighth forward speed according to an exemplary embodiment of the present invention.
Figure 17:
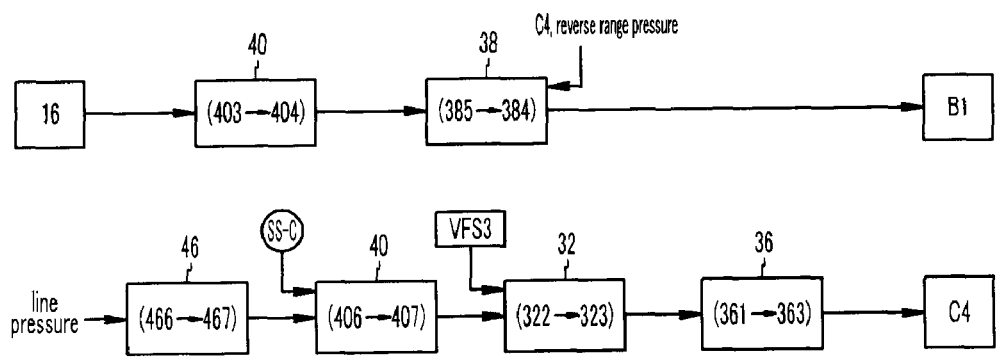
FIG. 17 is a block diagram of a hydraulic control system at a reverse speed according to an exemplary embodiment of the present invention.

In this case, the second brake B2 is released, and in a state in which the third clutch C3 is operated, the line pressure supplied to the third pressure control valve 32 through the fifth switching valve 40, the fourth pressure switching valve 46 and the third switching valve 36 is supplied to the first brake B1 through the fourth switching valve 38, as shown in FIG. 16. The fifth switching valve 40 is controlled by the third on/off solenoid valve SS-C, the third pressure control valve 32 is controlled by the third proportional control solenoid valve VFS3, and the third switching valve 36 is controlled by the second on/off solenoid valve.

At this time, the hydraulic path of the third switching valve 36 is converted by the second on/off solenoid valve SS-B and hydraulic pressure supplied from the third pressure control valve 32 is supplied to the first brake B1 through the fourth switching valve 38. Therefore, the third clutch C3 and the first brake B1 are operated and shifting to the eighth forward speed is realized.

[The Reverse Speed]

In the reverse speed, the third proportional control solenoid valve VFS3 and the third on/off solenoid valve SS-C are turned on.

In this case, the line pressure supplied to the third pressure control valve 32 through the fourth pressure switching valve 46 and the fifth switching valve 40 is supplied to the fourth clutch C4 through the third switching valve 36.

The fifth switching valve 40 is controlled by the third on/off solenoid valve SS-C, and the third pressure control valve 32 is controlled by the third proportional control solenoid valve VFS3.

In addition, the reverse range pressure of the manual valve 16 is supplied to the first brake B1 through the fifth switching valve 40 and the fourth switching valve 38. Therefore, the fourth clutch C4 and the first brake B1 are operated and shifting to the reverse speed is realized.

As described above, a hydraulic control system of an exemplary embodiment of the present invention, in which six friction members are controlled by four proportional control solenoid valves, enhances overall performance by achieving minimization of shift shock and enhancement of drivability and fuel consumption as a consequence of achieving precise and effective control.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A hydraulic control system of an 8-speed automatic transmission for vehicles, wherein a first clutch is operated at first, second, third, and fourth forward speeds, a second clutch is operated at a sixth forward speed, a third clutch is operated at fourth, fifth, sixth, seventh, and eighth forward speeds, a fourth clutch is operated at the third and fifth forward speeds and a reverse speed, a first brake is operated at the eighth forward speed and the reverse speed, and a second brake is operated at the second and seventh forward speeds, comprising:
- a first clutch/second clutch control portion controlled by a first proportional control solenoid valve and selectively supplying hydraulic pressure of a first pressure control valve to the first clutch or the second clutch;
- a third clutch control portion controlled by a second proportional control solenoid valve and supplying hydraulic pressure of a second pressure control valve to the third clutch as operating hydraulic pressure of the third clutch;
- a fourth clutch/first brake control portion controlled by a third proportional control solenoid valve and selectively supplying hydraulic pressure of a third pressure control valve to the fourth clutch or the first brake, the fourth clutch/first brake control portion supplying reverse range pressure to the first brake at the reverse speed; and
- a second brake control portion controlled by a fourth proportional control solenoid valve and directly supplying hydraulic pressure of a fourth pressure control valve to the second brake.

2. The hydraulic control system of claim 1, wherein the first, second, and fourth pressure control valves are controlled by forward range pressure, and the third pressure control valve is controlled by line pressure.

3. The hydraulic control system of claim 1, further comprising first, second, third, and fourth pressure switching valves that supply a part of output pressure of the first, second, third, and fourth pressure control valves back to the first, second, third, and fourth pressure control valves as their control pressures, respectively.

4. The hydraulic control system of claim 1, wherein the first clutch/second clutch control portion further comprises a first switching valve that selectively supplies hydraulic pressure received from the first pressure control valve to the first clutch or the second clutch by control pressure of a first on/off solenoid valve.

5. The hydraulic control system of claim 4, wherein the first switching valve comprises:
- a valve body comprising a first port fluidly communicating with an output port of the first pressure control valve, a second port supplying hydraulic pressure received through the first port to the first clutch, a third port supplying the hydraulic pressure received through the first port to the second clutch, and a fourth port receiving the control pressure of the first on/off solenoid valve; and
- a valve spool mounted in the valve body and enabling conversion of a hydraulic path according to the control pressure received through the fourth port.

6. The hydraulic control system of claim 1, wherein the fourth clutch/first brake control portion comprises third and fourth switching valves,
wherein the third switching valve selectively supplies hydraulic pressure received from the third pressure control valve to the fourth clutch or the fourth switching valve by control pressure of a second on/off solenoid valve, and
the fourth switching valve selectively supplies the hydraulic pressure received from the third switching valve or the reverse range pressure to the first brake.

7. The hydraulic control system of claim 6, wherein the third switching valve comprises:
- a valve body comprising a first port fluidly communicating with an output port of the third pressure control valve, a second port supplying hydraulic pressure received through the first port to the fourth switching valve, a third port supplying the hydraulic pressure received through the first port to the fourth clutch, and a fourth port receiving the control pressure of the second on/off solenoid valve; and
- a valve spool mounted in the valve body and enabling conversion of a hydraulic path according to the control pressure received through the fourth port.

8. The hydraulic control system of claim 6, wherein the fourth switching valve comprises:
- a valve body comprising a first port receiving the reverse range pressure as control pressure of the fourth switching valve, a second port selectively receiving a part of operating hydraulic pressure of the fourth clutch or the second brake as control pressure of the fourth switching valve, a third port receiving the hydraulic pressure from the third switching valve, a fourth port supplying the hydraulic pressure received through the third port to the first brake, and a fifth port receiving the reverse range pressure; and
- a valve spool mounted in the valve body and enabling conversion of a hydraulic path according to the control pressure received through the first and second ports.

9. The hydraulic control system of claim 8, further comprising a fifth switching valve that supplies line pressure to the third pressure control valve and supplies the reverse range pressure to the third switching valve.

10. The hydraulic control system of claim 9, wherein the fifth switching valve supplies line pressure to the third pressure control valve by control pressure of a third on/off solenoid valve in a forward speed and is controlled by the reverse range pressure in the reverse speed so as to supply the reverse range pressure to the fourth switching valve.

11. The hydraulic control system of claim 10, wherein the fifth switching valve comprises:
- a valve body comprising a first port receiving the control pressure from the third on/off solenoid valve, a second port receiving the reverse range pressure as control pressure of the fifth switching valve from a manual valve, a third port receiving the reverse range pressure from the manual valve, a fourth port supplying hydraulic pressure of the third port to the fourth switching valve, a fifth port exhausting hydraulic pressure of the fourth port, a sixth port receiving the line pressure from the fourth pressure switching valve, and a seventh port supplying hydraulic pressure of the sixth port to the third pressure control valve; and
- a valve spool mounted in the valve body and enabling conversion of a hydraulic path according to the control pressure received through the first and second ports.

12. A hydraulic control system of an 8-speed automatic transmission for vehicles, wherein a first clutch is operate at first, second, third, and fourth forward speeds, a second clutch is operated at a sixth forward speed, a third clutch is operated at fourth, fifth, sixth, seventh, and eighth forward speeds, a fourth clutch is operated at the third and fifth forward speeds and a reverse speed, a first brake is operated at the eighth forward speed and the reverse speed, and a second brake is operated at the second and seventh forward speeds, comprising:
- a first clutch/second clutch control portion controlled by a first proportional control solenoid valve and selectively supplying hydraulic pressure of a first pressure control valve to the first clutch or the second clutch according to control of a first switching valve;
- a third clutch control portion controlled by a second proportional control solenoid valve and supplying hydraulic pressure of a second pressure control valve to the third clutch as operating hydraulic pressure thereof;

a fourth clutch/first brake control portion controlled by a third proportional control solenoid valve and selectively supplying hydraulic pressure of a third pressure control valve to the fourth clutch or the first brake, wherein the fourth clutch receives the hydraulic pressure of the third pressure control valve through a third switching valve and the first brake selectively receives the hydraulic pressure of the third pressure control valve or a reverse range pressure through a fourth switching valve; and a second brake control portion controlled by a fourth proportional control solenoid valve and directly supplying hydraulic pressure of a fourth pressure control valve to the second brake.

13. The hydraulic control system of claim 12, wherein the first clutch/second clutch control portion comprises:

the first pressure control valve integrally formed with the first proportional control solenoid valve;

a first pressure switching valve operated by control pressure of the first proportional control solenoid valve and control pressure of a second reducing valve and supplying a part of output pressure of the first pressure control valve back to the first pressure control valve as control pressure thereof; and the first switching valve enabling conversion of a hydraulic path by a first on/off solenoid valve so as to selectively supply operating hydraulic pressure to the first clutch or the second clutch.

14. The hydraulic control system of claim 13, wherein the first switching valve comprises:

a valve body comprising a first port fluidly communicating with an output port of the first pressure control valve, a second port supplying hydraulic pressure received through the first port to the first clutch, a third port supplying the hydraulic pressure received through the first port to the second clutch, and a fourth port receiving control pressure of the first on/off solenoid valve; and a valve spool mounted in the valve body and enabling conversion of a hydraulic path according to the control pressure received through the fourth port.

15. The hydraulic control system of claim 13, wherein the fail-safe valve is controlled by a line pressure, operating hydraulic pressure of the first clutch, and operating hydraulic pressure of the second brake or the fourth clutch.

16. The hydraulic control system of claim 15, wherein the fail-safe valve comprises:

a valve body comprising a first port receiving operating hydraulic pressure for the third clutch from the second switching valve, a second port supplying hydraulic pressure received through the first port to the third clutch, a third port exhausting the hydraulic pressure of the second port, a fourth port receiving the line pressure as control pressure of the fail-safe valve, a fifth port receiving the operating hydraulic pressure of the fourth clutch or the second brake as control pressure of the fail-safe valve, and a sixth port receiving the operating hydraulic pressure of the first clutch as control pressure of the fail-safe valve; and a valve spool mounted in the valve body and enabling conversion of a hydraulic path according to the control pressure received through the fourth, fifth, and sixth ports.

17. The hydraulic control system of claim 12, wherein the third clutch control portion comprises:

the second pressure control valve integrally formed with the second proportional control solenoid valve;

a second pressure switching valve operated by control pressure of the second proportional control solenoid valve and control pressure of a second reducing valve and supplying a part of output pressure of the second pressure control valve back to the second pressure control valve as control pressure thereof;

a second switching valve relaying hydraulic pressure received from the second pressure control valve; and a fail-safe valve supplying operating hydraulic pressure received from the second switching valve to the third clutch according to control pressure received through three different routes.

18. The hydraulic control system of claim 12, wherein the fourth clutch/first brake control portion comprises:

the third pressure control valve integrally formed with the third proportional control solenoid valve;

a third pressure switching valve operated by control pressure of the third proportional control solenoid valve and control pressure of the second reducing valve and supplying a part of output pressure of the third pressure control valve back to the third pressure control valve as control pressure thereof;

the third switching valve selectively supplying the hydraulic pressure received from the third pressure control valve to the fourth clutch or the first brake according to control pressure of the second on/off solenoid valve;

the fourth switching valve selectively supplying the hydraulic pressure received from the third switching valve or the reverse range pressure to the first brake; and a fifth switching valve supplying line pressure to the third pressure control valve according to control pressure of the third on/off solenoid valve and supplying the reverse range pressure to the fourth switching valve according to control of the reverse range pressure.

19. The hydraulic control system of claim 18, wherein the third switching valve comprises:

a valve body comprising a first port fluidly communicating with an output port of the third pressure control valve, a second port supplying hydraulic pressure received through the first port to the fourth switching valve, a third port supplying the hydraulic pressure received through the first port to the fourth clutch, and a fourth port receiving control pressure of the second on/off solenoid valve; and a valve spool mounted in the valve body and enabling conversion of a hydraulic path according to the control pressure received through the fourth port.

20. The hydraulic control system of claim 18, wherein the fourth switching valve comprises:

a valve body comprising a first port receiving the reverse range pressure as control pressure of the fourth switching valve, a second port selectively receiving a part of the operating hydraulic pressure of the fourth clutch or the second brake as control pressure of the fourth switching valve, a third port receiving the hydraulic pressure from the third switching valve, a fourth port supplying the hydraulic pressure received through the third port to the first brake, and a fifth port receiving the reverse range pressure; and a valve spool mounted in the valve body and enabling conversion of a hydraulic path according to the control pressure received through the first and second ports.

21. The hydraulic control system of claim 18, wherein the fifth switching valve supplies the line pressure to the third pressure control valve according to control pressure of the third on/off solenoid valve at a forward speed and supplies the reverse range pressure to the fourth switching valve according to control of the reverse range pressure at the reverse speed.

22. The hydraulic control system of claim 21, wherein the fifth switching valve comprises:
- a valve body comprising a first port receiving control pressure from the third on/off solenoid valve, a second port receiving the reverse range pressure from a manual valve as control pressure of the fifth switching valve, a third port receiving the reverse range pressure from the manual valve, a fourth port supplying the hydraulic pressure of the third port to the fourth switching valve, a fifth port exhausting the hydraulic pressure of the fourth port, a sixth port receiving line pressure from the fourth pressure switching valve, and a seventh port supplying the hydraulic pressure of the sixth port to the third pressure control valve; and
- a valve spool mounted in the valve body and enabling conversion of a hydraulic path according to the control pressure received through the first and second port.

23. The hydraulic control system of claim 12, wherein the second brake control portion comprises:
- the fourth pressure control valve integrally formed with the fourth proportional control solenoid valve;
- a fourth pressure switching valve operated by control pressure of the fourth proportional control solenoid valve and control pressure of a second reducing valve and supplying a part of output pressure of the fourth pressure control valve back to the fourth pressure control valve; and
- a shuttle valve selectively supplying operating hydraulic pressure of the second brake or the fourth clutch to a fail-safe valve or the fourth switching valve as control pressure thereof.

24. The hydraulic control system of claim 23, wherein the shuttle valve comprises:
- a valve body comprising a first port fluidly communicating with the fourth clutch, a second port fluidly communicating with the second brake, a third port selectively fluid-communicating with the first port, and a fourth port selectively fluid-communicating with the second port; and
- a valve spool mounted in the valve body and enabling conversion of a hydraulic path according to hydraulic pressure received through the first and second ports.

* * * * *